(12) United States Patent
Bush

(10) Patent No.: US 11,815,280 B2
(45) Date of Patent: Nov. 14, 2023

(54) SYSTEM AND METHOD FOR CONTROLLING THE OPERATION OF A FAN IN AN AIR CONDITIONING SYSTEM

(71) Applicant: Mitsubishi Electric US, Inc., Cypress, CA (US)

(72) Inventor: Joseph Paul Bush, Lawrenceville, GA (US)

(73) Assignee: MITSUBISHI ELECTRIC US, INC., Cypress, CA (US)

( * ) Notice: Subject to any disclaimer, the term of this patent is extended or adjusted under 35 U.S.C. 154(b) by 46 days.

(21) Appl. No.: 17/589,391

(22) Filed: Jan. 31, 2022

(65) Prior Publication Data

US 2023/0243543 A1  Aug. 3, 2023

(51) Int. Cl.
*G05B 15/02* (2006.01)
*F24F 11/77* (2018.01)
(Continued)

(52) U.S. Cl.
CPC .............. *F24F 11/77* (2018.01); *F24F 11/64* (2018.01); *G05B 15/02* (2013.01); *F24F 2110/10* (2018.01)

(58) Field of Classification Search
CPC ........ F24F 11/77; F24F 11/64; F24F 2110/10; F24F 11/30; F24F 11/46; F24F 3/153; G05B 15/02
See application file for complete search history.

(56) References Cited

U.S. PATENT DOCUMENTS

2005/0092004 A1 * 5/2005 Lee .......................... F24F 11/86
                                                                        62/157
2008/0307803 A1   12/2008 Herzon
(Continued)

FOREIGN PATENT DOCUMENTS

CN  111706974 A * 9/2020 .............. F24F 11/61
CN  112240633 A   1/2021
(Continued)

OTHER PUBLICATIONS

Andrade et al., "Controlling Indoor Humidity Using Variable-Speed Compressors and Blowers", Air Conditioning and Refrigeration Center, Mechanical & Industrial Engineering Dept., University of Illinois, Jul. 1999, pp. i-ix and 1-73.

*Primary Examiner* — Alicia M. Choi
(74) *Attorney, Agent, or Firm* — POSZ LAW GROUP, PLC

(57) ABSTRACT

A computer-implemented method is provided of controlling operation of an indoor fan in an air conditioning system, the method including: setting a fan speed of the indoor fan to a maximum value; storing a first low temperature as a low temperature threshold; measuring the indoor temperature in an indoor space as a current indoor temperature; subtracting a set point temperature from the current indoor temperature to determine a temperature difference; determining that the temperature difference is less than the low temperature threshold; and reducing the fan speed by a first adjustment interval, storing a second low temperature difference as the low temperature threshold, and storing a second high temperature as a high temperature threshold, all in response to the determining that the current temperature difference is less than the low temperature threshold.

17 Claims, 8 Drawing Sheets

(51) Int. Cl.
*F24F 11/64* (2018.01)
*F24F 110/10* (2018.01)

(56) References Cited

U.S. PATENT DOCUMENTS

| | | |
|---|---|---|
| 2009/0192650 A1 | 7/2009 | Tonner |
| 2010/0204838 A1 | 8/2010 | DiPaolo et al. |
| 2012/0060530 A1* | 3/2012 | Shimoda ............... F24F 11/65 62/132 |
| 2012/0303165 A1 | 11/2012 | Qu et al. |
| 2013/0151019 A1* | 6/2013 | Federspiel ............. F24F 11/76 700/276 |
| 2014/0345826 A1* | 11/2014 | Kim ....................... F24F 11/46 165/11.1 |
| 2015/0094861 A1* | 4/2015 | Choi .................... B60H 1/00985 700/276 |
| 2015/0115047 A1* | 4/2015 | Okamoto ............... F24F 11/30 236/1 E |
| 2016/0061501 A1* | 3/2016 | Billman ................. F24F 11/88 62/115 |
| 2016/0178222 A1* | 6/2016 | Bush ..................... F24F 11/46 62/176.1 |
| 2017/0211833 A1* | 7/2017 | Tran ...................... F25B 49/022 |
| 2018/0180317 A1* | 6/2018 | Yoon ..................... F24F 11/70 |
| 2018/0372359 A1* | 12/2018 | Goel ..................... F24F 11/46 |
| 2019/0063803 A1* | 2/2019 | Kerstner ................ F25D 11/02 |
| 2019/0323717 A1* | 10/2019 | Xu ......................... F24F 11/70 |
| 2019/0323722 A1* | 10/2019 | Goel ..................... F25B 29/003 |
| 2020/0116382 A1* | 4/2020 | Yang ..................... F24F 11/63 |
| 2020/0300489 A1* | 9/2020 | Morishita .............. F24F 1/32 |

FOREIGN PATENT DOCUMENTS

| | | | |
|---|---|---|---|
| CN | 113091267 A * | 7/2021 | ........... F24F 11/46 |
| EP | 3677850 A1 | 7/2020 | |

* cited by examiner

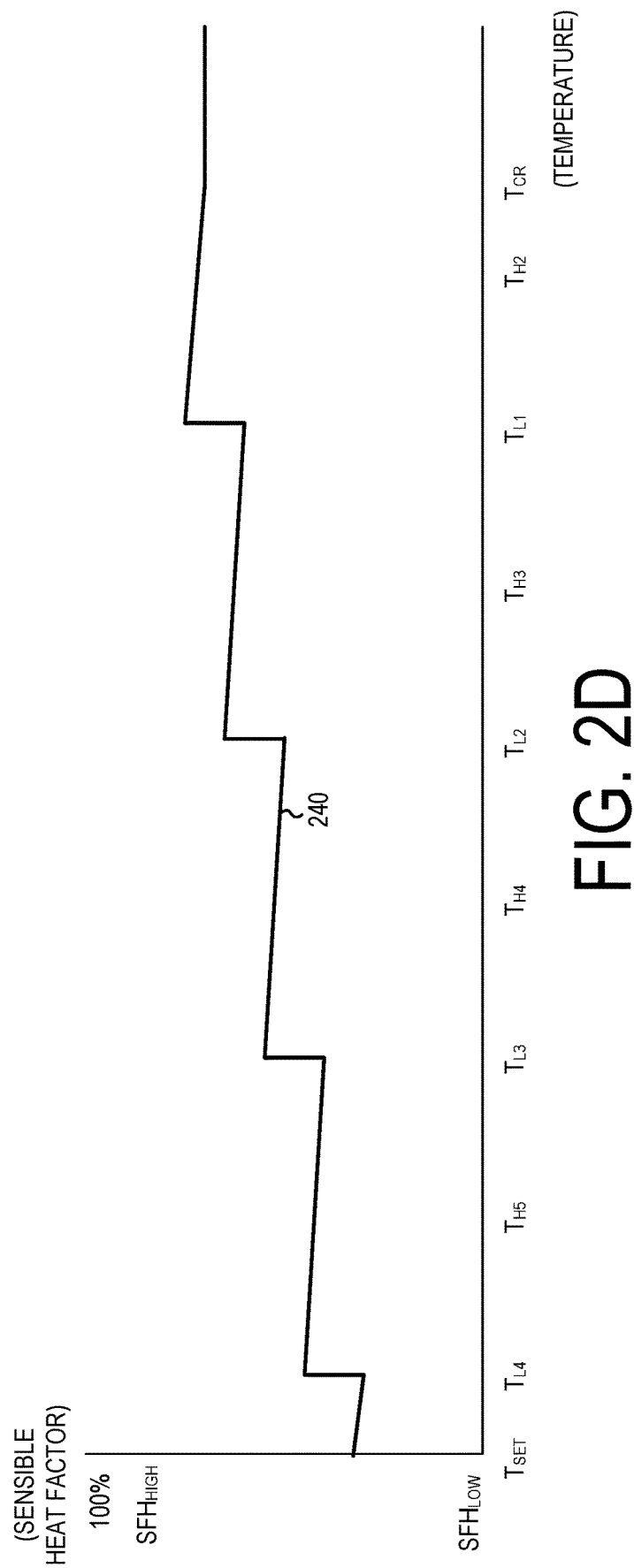

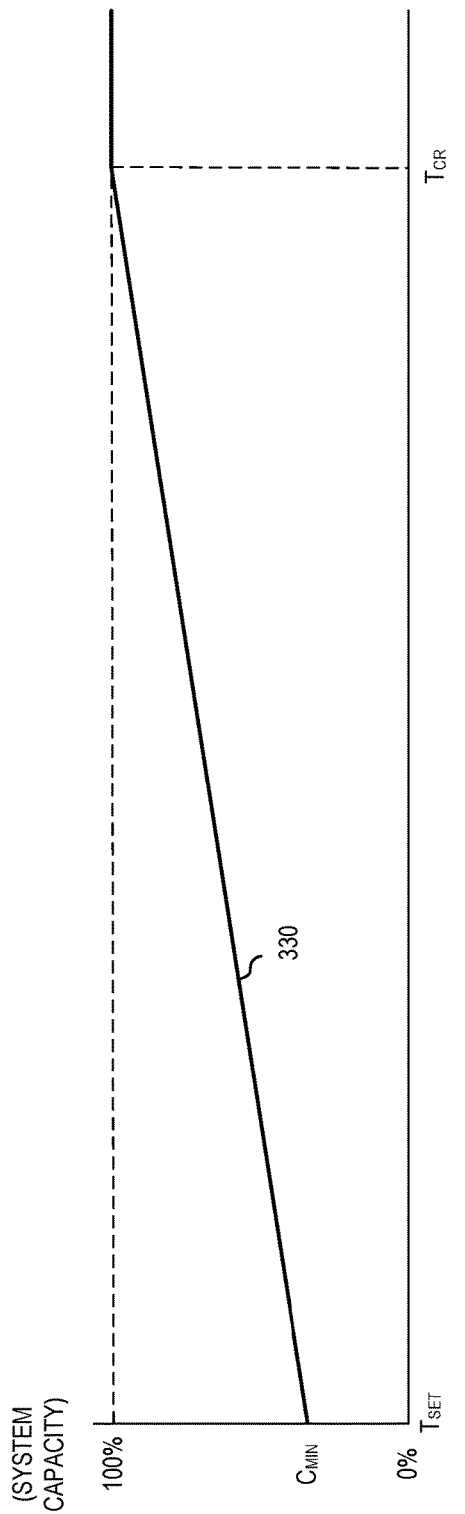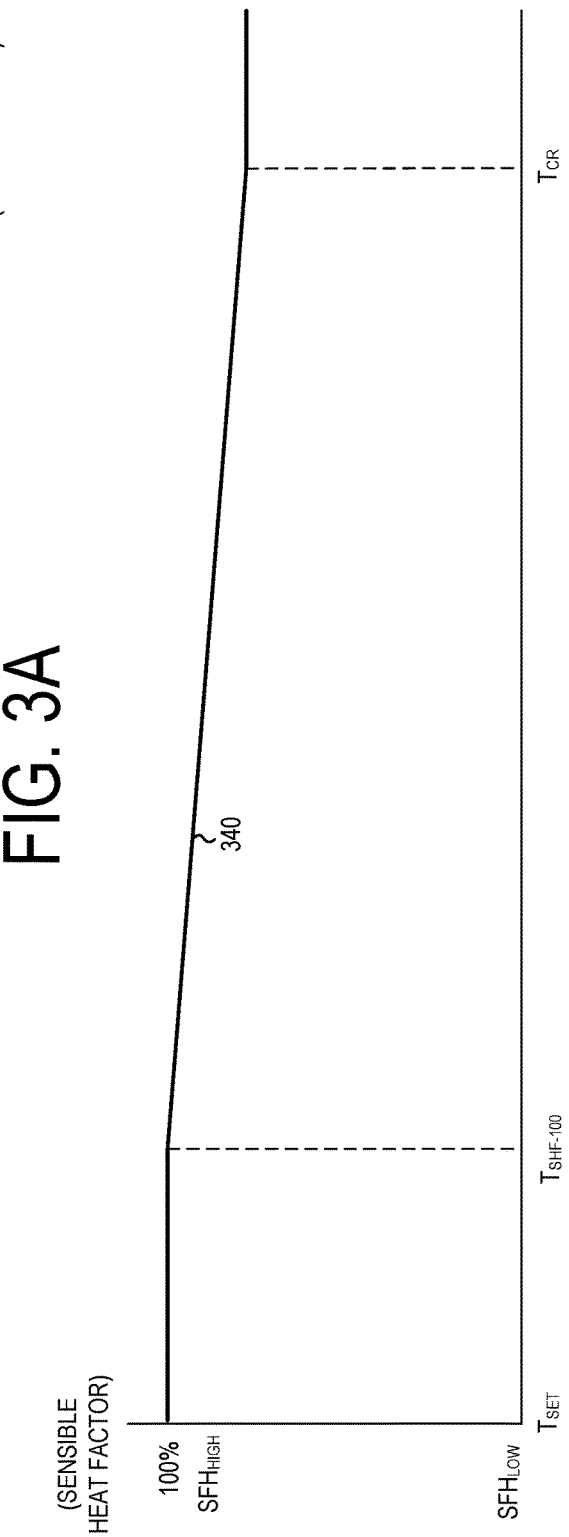
FIG. 3A
FIG. 3B

SYSTEM AND METHOD FOR CONTROLLING THE OPERATION OF A FAN IN AN AIR CONDITIONING SYSTEM

TECHNICAL FIELD

The disclosed methods relate generally to methods for controlling the operation of a fan in an air conditioning system. More particularly, the disclosed methods relate to a method for controlling the operation of an indoor fan in an indoor air conditioning system during a cooling operation by stepping the speed of the fan down in tandem with the indoor air conditioner stepping down the operating frequency of a compressor, thereby efficiently cooling an indoor space while maintaining a sensible heat factor low enough for some of the system cooling capacity to provide latent cooling to remove moisture from supply air being cooled.

BACKGROUND

Some air conditioner systems vary the speed of a compressor during a cooling operation based on how close a room temperature of a room being cooled is to a set point temperature. This is typically done by varying the frequency of the motor of the compressor. The air conditioning system raises the speed of the compressor (to a maximum of 100%) when the room temperature moves farther from the set point temperature and lowers the speed of the compressor when the room temperature moves closer to the set point temperature.

Typically, such a system will operate the compressor at full capacity until the difference between the room temperature and the set point temperature reaches a threshold value. At this point, it will begin lowering the speed (frequency) of the compressor as the room temperature approaches the set point temperature. If, during this process, the room temperature rises, the system will raise the speed (frequency) of the compressor accordingly. The change in compressor speed (frequency) will typically be effectively linear, though it may be stepwise for ease of implementation.

As the speed (frequency) of the compressor is reduced during a cooling operation, the system capacity will be reduced and the refrigerant passing through an indoor heat exchanger will become warmer. This operation allows the air conditioning system to approach an equilibrium cooling status when the room temperature reaches the set point temperature at which point the air conditioning system may maintain the room temperature at the set point temperature assuming no change in the room load. The speed of a fan blowing air across the indoor heat exchanger remains at full speed during this operation.

In an air conditioner system operating in a cooling mode, the cooling capacity of the air conditioner system can be divided into a sensible heat factor (SHF) and a latent heat factor (LHF), which are percentages that total to 100%. The SHF refers to the percentage of system capacity that causes the air to be cooled; and the LHF refers to the percentage of system capacity that causes moisture to be removed from the supply air.

As the speed (frequency) of the compressor is reduced during a cooling operation and the refrigerant flowing through the indoor heat exchanger becomes warmer, the SHF will rise, since the refrigerant is less able to cool air passing through the indoor heat exchanger. Since the sum of SHF and LHF is 100%, as the SHF rises, the LHF drops. When the speed (frequency) of the compressor gets sufficiently low, the SHF may reach 100%, meaning that the LHF will reach 0%. In other words, as the speed (frequency) of the compressor gets sufficiently low when the room temperature approaches the set point temperature, the air conditioner system will cease removing moisture from the supply air.

If the air conditioner system stops removing moisture from the supply air, the humidity in the room may rise, depending upon the humidity of the supply air. In such a case, an operator may choose to lower the set point temperature. This will increase the difference between the room temperature and the set point temperature, potentially raising the LHF above 0% and allowing the air conditioner system to remove moisture from the supply air. However, this has the undesirable effect of using more power and causing the operator to set the room temperature to an undesirably low temperature.

It is therefore desirable to provide a method of operating an air conditioning system such that the LHF will be maintained above zero during a cooling operation even as the speed (frequency) of the compressor is reduced.

SUMMARY OF THE INVENTION

According to one or more embodiments, a computer-implemented method is provided of controlling operation of an indoor fan configured to blow air through the indoor heat exchanger in an air conditioning system, the air conditioning system including the indoor heat exchanger, the indoor fan, and a compressor configured to pump refrigerant through the indoor heat exchanger, the method comprising: setting a fan speed of the indoor fan to a maximum value; storing a first low temperature difference as a low temperature difference threshold; measuring the indoor temperature in an indoor space serviced by the air conditioning system as a current indoor temperature; subtracting a set point temperature that represents a desired temperature for the indoor space from the current indoor temperature to determine a current temperature difference between the current indoor temperature and the set point temperature; determining that the temperature difference is less than the low temperature difference threshold; reducing the fan speed by a first adjustment interval in response to the determining that the current temperature difference is less than the low temperature difference threshold; storing a second low temperature difference as the low temperature difference threshold in response to the determining that the current temperature difference is less than the low temperature difference threshold; and storing a second high temperature difference as a high temperature difference threshold in response to the determining that the current temperature difference is less than the low temperature difference threshold. The first low temperature difference may be lower than a compressor reduction temperature difference threshold that represents a temperature difference at which the air conditioning system begins lowering an operation frequency of a compressor, the second high temperature difference may be greater than the first low temperature difference, and the second low temperature difference may be smaller than the first low temperature difference.

The method may further comprise: measuring the indoor temperature a delay time after the reducing of the fan speed of the indoor fan by the first adjustment interval as the current indoor temperature; subtracting the set point temperature from the current indoor temperature to determine the current temperature difference between the current indoor temperature and the set point temperature; determining that the current temperature difference is less than the low temperature difference threshold; reducing the fan speed of the indoor fan by a second adjustment interval in response to the determining that the current temperature difference is less than the low temperature difference threshold; storing a third low temperature difference as the low temperature difference threshold in response to the determining that the current temperature difference is less than the low temperature difference threshold; and storing a third high temperature difference as the high temperature difference threshold in response to the determining that the current temperature difference is less than the low temperature difference threshold. The third high temperature difference may be between the second low temperature difference and the first low temperature difference, and the third low temperature difference may be smaller than the second low temperature difference.

The first adjustment interval may be between 10% of a maximum fan speed and 20% of the maximum fan speed, and the second adjustment interval may be between 10% of a maximum fan speed and 20% of the maximum fan speed.

The first adjustment interval may be the same as the second adjustment interval, or the first adjustment interval may be different from the second adjustment interval.

The method may further comprise: setting a fan speed to a minimum value after the reducing of the fan speed of the indoor fan by the second adjustment interval; storing a fifth high temperature difference as the high temperature difference threshold after the reducing of the fan speed of the indoor fan by the second adjustment interval; measuring the indoor temperature after the setting of the fan speed to the minimum value as the current indoor temperature; subtracting the set point temperature from the current indoor temperature to determine the current temperature difference between the current indoor temperature and the set point temperature; determining that the current temperature difference is greater than the high temperature difference threshold; increasing the fan speed of the indoor fan by a fourth adjustment interval in response to the determining that the current temperature difference is greater than the high temperature difference threshold; storing a fourth low temperature difference as the low temperature difference threshold in response to the determining that the current temperature difference is greater than the high temperature difference threshold; and storing a fourth high temperature difference as the high temperature difference threshold in response to the determining that the current temperature difference is greater than the high temperature difference threshold. The fourth high temperature difference may be between the third low temperature difference and the second low temperature difference, the fourth low temperature difference may be smaller than the fifth high temperature difference, and the fifth high temperature difference may be between the fourth low temperature difference and the third low temperature difference.

The first adjustment interval may be between 10% of a maximum fan speed and 20% of the maximum fan speed, the second adjustment interval may be between 10% of a maximum fan speed and 20% of the maximum fan speed, and the fourth adjustment interval may be between 10% of a maximum fan speed and 20% of the maximum fan speed.

The first adjustment interval, the second adjustment interval, and the fourth adjustment interval may be all the same, or at least two of the first adjustment interval, the second adjustment interval, and the fourth adjustment interval may have different values.

The method may further comprise: measuring the indoor temperature a delay time after the reducing of the fan speed of the indoor fan by the first adjustment interval; subtracting the set point temperature from the current indoor temperature to determine the current temperature difference between the current indoor temperature and the set point temperature; determining that the current temperature difference is greater than the high temperature difference threshold; increasing the fan speed of the indoor fan by the first adjustment interval in response to the determining that the current temperature difference is greater than the high temperature difference threshold; and storing the first low temperature difference as the low temperature difference threshold in response to the determining that the current temperature difference is greater than the high temperature difference threshold.

The controller may be further configured to reduce an operation frequency of the compressor at each of a set compressor adjustment temperature difference thresholds starting at the compressor reduction temperature difference threshold, and between two and five compressor adjustment temperature difference thresholds may be located between the compressor reduction temperature difference threshold and the first low temperature difference.

The controller may be is further configured to reduce the operation frequency of the compressor by between 5% and 10% of a maximum compressor frequency at each of the compressor adjustment temperature difference thresholds.

There may be between three and five adjustment intervals between the maximum fan speed and a minimum fan speed.

A non-transitory computer-readable medium is provided comprising instructions for execution by a computer, the instructions including a computer-implemented method for controlling operation of an indoor fan configured to blow air through the indoor heat exchanger in an air conditioning system, the air conditioning system including the indoor heat exchanger, the indoor fan, a compressor configured to pump refrigerant through the indoor heat exchanger, the instructions for implementing: setting a fan speed of the indoor fan to a maximum value; storing a first low temperature difference as a low temperature difference threshold; measuring the indoor temperature in an indoor space serviced by the air conditioning system as a current indoor temperature; subtracting a set point temperature that represents a desired temperature for the indoor space from the current indoor temperature to determine a current temperature difference between the current indoor temperature and the set point temperature; determining that the temperature difference is less than the low temperature difference threshold; reducing the fan speed by a first adjustment interval in response to the determining that the current temperature difference is less than the low temperature difference threshold; storing a second low temperature difference as the low temperature difference threshold in response to the determining that the current temperature difference is less than the low temperature difference threshold; and storing a second high temperature difference as a high temperature difference threshold in response to the determining that the current temperature difference is less than the low temperature difference threshold. The first low temperature difference may be lower than a compressor reduction temperature difference threshold that represents a temperature difference at which the air conditioning system begins lowering an operation frequency of a compressor, the second high temperature difference may be greater than the first low temperature difference, and the second low temperature difference may be smaller than the first low temperature difference.

The instructions may further implement: measuring the indoor temperature a delay time after the reducing of the fan speed of the indoor fan by the first adjustment interval as the current indoor temperature; subtracting the set point temperature from the current indoor temperature to determine the current temperature difference between the current indoor temperature and the set point temperature; determining that the current temperature difference is less than the low temperature difference threshold; reducing the fan speed of the indoor fan by a second adjustment interval in response to the determining that the current temperature difference is less than the low temperature difference threshold; storing a third low temperature difference as the low temperature difference threshold in response to the determining that the current temperature difference is less than the low temperature difference threshold; and storing a third high temperature difference as the high temperature difference threshold in response to the determining that the current temperature difference is less than the low temperature difference threshold. The third high temperature difference may be between the second low temperature difference and the first low temperature difference, and the third low temperature difference is smaller than the second low temperature difference.

The first adjustment interval may be between 10% of a maximum fan speed and 20% of the maximum fan speed, and the second adjustment interval may be between 10% of a maximum fan speed and 20% of the maximum fan speed.

The first adjustment interval may be the same as the second adjustment interval, or the first adjustment interval may be different from the second adjustment interval.

The instructions may further implement: setting a fan speed to a minimum value after the reducing of the fan speed of the indoor fan by the second adjustment interval; storing a fifth high temperature difference as the high temperature difference threshold after the reducing of the fan speed of the indoor fan by the second adjustment interval; measuring the indoor temperature after the setting of the fan speed to the minimum value as the current indoor temperature; subtracting the set point temperature from the current indoor temperature to determine the current temperature difference between the current indoor temperature and the set point temperature; determining that the current temperature difference is greater than the high temperature difference threshold; increasing the fan speed of the indoor fan by a fourth adjustment interval in response to the determining that the current temperature difference is greater than the high temperature difference threshold; storing a fourth low temperature difference as the low temperature difference threshold in response to the determining that the current temperature difference is greater than the high temperature difference threshold; and storing a fourth high temperature difference as the high temperature difference threshold in response to the determining that the current temperature difference is greater than the high temperature difference threshold. The fourth high temperature difference may be between the third low temperature difference and the second low temperature difference, the fourth low temperature difference may be smaller than the fifth high temperature difference, and the fifth high temperature difference may be between the fourth low temperature difference and the third low temperature difference.

The first adjustment interval may be between 10% of a maximum fan speed and 20% of the maximum fan speed, the second adjustment interval may be between 10% of a maximum fan speed and 20% of the maximum fan speed, and the fourth adjustment interval may be between 10% of a maximum fan speed and 20% of the maximum fan speed.

The first adjustment interval, the second adjustment interval, and the fourth adjustment interval may all be the same, or at least two of the first adjustment interval, the second adjustment interval, and the fourth adjustment interval may have different values.

The instructions may further implement: measuring the indoor temperature a delay time after the reducing of the fan speed of the indoor fan by the first adjustment interval; subtracting the set point temperature from the current indoor temperature to determine the current temperature difference between the current indoor temperature and the set point temperature; determining that the current temperature difference is greater than the high temperature difference threshold; increasing the fan speed of the indoor fan by the first adjustment interval in response to the determining that the current temperature difference is greater than the high temperature difference threshold; and storing the first low temperature difference as the low temperature difference threshold in response to the determining that the current temperature difference is greater than the high temperature difference threshold.

The controller may be further configured to reduce an operation frequency of the compressor at each of a set compressor adjustment temperature difference thresholds starting at the compressor reduction temperature difference threshold, and between two and five compressor adjustment temperature difference thresholds may be located between the compressor reduction temperature difference threshold and the first low temperature difference.

The controller may be further configured to reduce the operation frequency of the compressor by between 5% and 10% of a maximum compressor frequency at each of the compressor adjustment temperature difference thresholds.

There may be between three and five adjustment intervals between the maximum fan speed and a minimum fan speed.

A computer system is provided configured for controlling operation of an indoor fan configured to blow air through the indoor heat exchanger in an air conditioning system, the air conditioning system including the indoor heat exchanger, the indoor fan, and a compressor configured to pump refrigerant through the indoor heat exchanger, the system comprising: a communications interface operable to transmit and receive communications over at least a portion of the air conditioning system; a memory configured to store data and instructions; and a processor cooperatively operable with the communications interface and the memory, and configured to facilitate: setting a fan speed of the indoor fan to a maximum value; storing a first low temperature difference as a low temperature difference threshold; measuring the indoor temperature in an indoor space serviced by the air conditioning system as a current indoor temperature; subtracting a set point temperature that represents a desired temperature for the indoor space from the current indoor temperature to determine a current temperature difference between the current indoor temperature and the set point temperature; determining that the temperature difference is less than the low temperature difference threshold; reducing the fan speed by a first adjustment interval in response to the determining that the current temperature difference is less than the low temperature difference threshold; storing a second low temperature difference as the low temperature difference threshold in response to the determining that the current temperature difference is less than the low temperature difference threshold; and storing a second high temperature difference as a high temperature difference threshold in response to the determining that the current temperature difference is less than the low temperature difference threshold. The first low temperature difference may be lower than a compressor reduction temperature difference threshold that represents a temperature difference at which the air conditioning system begins lowering an operation frequency of a compressor, the second high temperature difference may be greater than the first low temperature difference, and the second low temperature difference may be smaller than the first low temperature difference.

The processor may be further configured to facilitate: measuring the indoor temperature a delay time after the reducing of the fan speed of the indoor fan by the first adjustment interval as the current indoor temperature; subtracting the set point temperature from the current indoor temperature to determine the current temperature difference between the current indoor temperature and the set point temperature; determining that the current temperature difference is less than the low temperature difference threshold; reducing the fan speed of the indoor fan by a second adjustment interval in response to the determining that the current temperature difference is less than the low temperature difference threshold; storing a third low temperature difference as the low temperature difference threshold in response to the determining that the current temperature difference is less than the low temperature difference threshold; and storing a third high temperature difference as the high temperature difference threshold in response to the determining that the current temperature difference is less than the low temperature difference threshold. The third high temperature difference may be between the second low temperature difference and the first low temperature difference, and the third low temperature difference may be smaller than the second low temperature difference.

The first adjustment interval may be between 10% of a maximum fan speed and 20% of the maximum fan speed, and the second adjustment interval may be between 10% of a maximum fan speed and 20% of the maximum fan speed.

The first adjustment interval may be the same as the second adjustment interval, or the first adjustment interval may be different from the second adjustment interval.

The processor may be further configured to facilitate: setting a fan speed to a minimum value after the reducing of the fan speed of the indoor fan by the second adjustment interval; storing a fifth high temperature difference as the high temperature difference threshold after the reducing of the fan speed of the indoor fan by the second adjustment interval; measuring the indoor temperature after the setting of the fan speed to the minimum value as the current indoor temperature; subtracting the set point temperature from the current indoor temperature to determine the current temperature difference between the current indoor temperature and the set point temperature; determining that the current temperature difference is greater than the high temperature difference threshold; increasing the fan speed of the indoor fan by a fourth adjustment interval in response to the determining that the current temperature difference is greater than the high temperature difference threshold; storing a fourth low temperature difference as the low temperature difference threshold in response to the determining that the current temperature difference is greater than the high temperature difference threshold; and storing a fourth high temperature difference as the high temperature difference threshold in response to the determining that the current temperature difference is greater than the high temperature difference threshold. The fourth high temperature difference may be between the third low temperature difference and the second low temperature difference, the fourth low temperature difference may be smaller than the fifth high temperature difference, and the fifth high temperature difference may be between the fourth low temperature difference and the third low temperature difference.

The first adjustment interval may be between 10% of a maximum fan speed and 20% of the maximum fan speed, the second adjustment interval may be between 10% of a maximum fan speed and 20% of the maximum fan speed, and the fourth adjustment interval may be between 10% of a maximum fan speed and 20% of the maximum fan speed.

The first adjustment interval, the second adjustment interval, and the fourth adjustment interval may all be the same, or at least two of the first adjustment interval, the second adjustment interval, and the fourth adjustment interval may have different values.

The processor may be further configured to facilitate: measuring the indoor temperature a delay time after the reducing of the fan speed of the indoor fan by the first adjustment interval; subtracting the set point temperature from the current indoor temperature to determine the current temperature difference between the current indoor temperature and the set point temperature; determining that the current temperature difference is greater than the high temperature difference threshold; increasing the fan speed of the indoor fan by the first adjustment interval in response to the determining that the current temperature difference is greater than the high temperature difference threshold; and storing the first low temperature difference as the low temperature difference threshold in response to the determining that the current temperature difference is greater than the high temperature difference threshold.

The controller may be further configured to reduce an operation frequency of the compressor at each of a set compressor adjustment temperature difference thresholds starting at the compressor reduction temperature difference threshold, and between two and five compressor adjustment temperature difference thresholds may be located between the compressor reduction temperature difference threshold and the first low temperature difference.

The controller may be further configured to reduce the operation frequency of the compressor by between 5% and 10% of a maximum compressor frequency at each of the compressor adjustment temperature difference thresholds.

There may be between three and five adjustment intervals between the maximum fan speed and a minimum fan speed.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present disclosure.

FIG. 2D is a graph of a sensible heat factor in an air conditioning system versus current indoor temperature during a cooling operation according to disclosed embodiments;

FIG. 3A is a graph of system capacity in an air conditioning system versus current indoor temperature during a cooling operation without the fan control of FIG. 2A;

FIG. 3B is a graph of a sensible heat factor in an air conditioning system versus current indoor temperature during a cooling operation without the fan control of FIG. 2A;

DETAILED DESCRIPTION

Air Conditioning System

Figure 1:
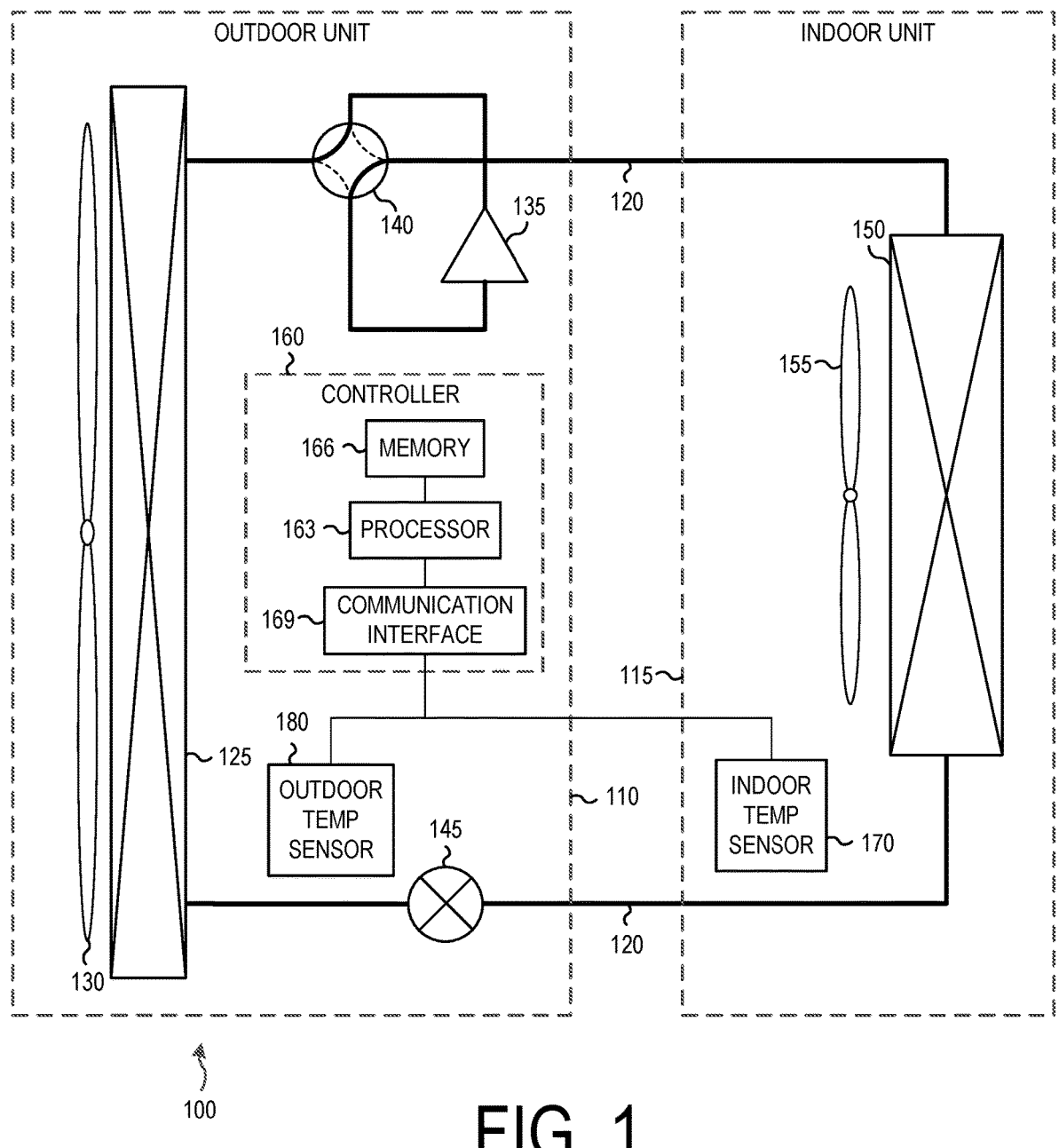
FIG. 1 is a block diagram of an air conditioning system according to first disclosed embodiments.

FIG. 1 is a block diagram of an air conditioning system according to disclosed embodiments. As shown in FIG. 1, the air conditioning system 100 includes an outdoor unit 110 and an indoor unit 115 connected by refrigerant pipes 120. The outdoor unit 110 includes an outdoor heat exchanger 125, an outdoor fan 130, a compressor 135, a four-way valve 140, an expansion valve 145, and an outdoor temperature sensor 180. The indoor unit 115 includes an indoor heat exchanger 150, an indoor fan 155, and an indoor temperature sensor 170. The air conditioning system 100 also includes a controller 160, which further includes a processor 163, a memory 166, and a communications interface 169. In the embodiment of FIG. 1, the controller 160 is placed in the outdoor unit 110, though in alternate embodiments the controller 160 could be placed in the indoor unit 115 or its functionality could be shared between the outdoor unit 110 and the indoor unit 115.

The outdoor unit 110 is a portion of the air conditioning system 100 that is located entirely or primarily outside of a building containing an indoor space that is being heated or cooled by the air conditioning system 100. It operates to draw in outside air, exchange heat between refrigerant in the air conditioning system 100 and the outside air to either heat or cool the refrigerant, and then pass the heated or cooled refrigerant back to the indoor unit 115.

The indoor unit 115 is a portion of the air conditioning system 100 that is located entirely or primarily inside of a building containing the indoor space that is being heated or cooled. It operates to draw in supply air, exchange heat between refrigerant in the air conditioning system 100 and the supply air to either heat or cool the supply air, and then provide the heated or cooled supply air to the indoor space, and then pass the refrigerant back to the outdoor unit 110.

The refrigerant pipes 120 are pipes that allow the refrigerant to circulate between the outdoor unit 110 and the indoor unit 115 and throughout the outdoor unit 110 and the indoor unit 115 and facilitate the exchange of heat between the refrigerant and air (either outside air or supply air) that passes over the refrigerant pipes.

The outdoor heat exchanger 125 includes a heat exchange coil that operates to exchange heat between refrigerant passing through the heat exchange coil in the outdoor heat exchanger 125 and outside air blown over the heat exchange coil in the outdoor heat exchanger 125. During a heating operation the refrigerant in the outdoor heat exchanger 125 will absorb heat from the outdoor air, and during a cooling operation the outdoor heat exchanger 125 will dissipate heat to the outdoor air.

The outdoor fan 130 operates to blow the outside air across or through the outdoor heat exchanger 125 to allow heat to be exchanged between the refrigerant in the outdoor heat exchanger 125 and the outside air. The outdoor fan 130 can be located such that it blows air across or through the outdoor heat exchanger 125 or such that it draws air across or through the outdoor heat exchanger 125.

The compressor 135 operates to receive refrigerant at a low pressure at a compressor input port, compress the refrigerant to a higher pressure, and provide the higher-pressure refrigerant to either the outdoor heat exchanger 125 or the indoor heat exchanger 150 from a compressor output port via the four-way valve 135. The compressor 135 also operates to circulate the refrigerant through the refrigerant pipes 120 in the air conditioning system 100.

The speed of the compressor 135 can be controlled by varying the operating frequency of a motor in the compressor 135. At a maximum frequency (i.e., 100% frequency), the compressor 135 will provide a maximum amount of compression to the refrigerant, giving it the highest pressure it can at its output port. As the frequency of the compressor 135 is reduced and it rotates more slowly, the amount of compression will likewise be reduced, causing the refrigerant pressure at the output port to be correspondingly reduced.

The four-way valve 140 operates to selectively connect the input and output ports of the compressor 135 to the outdoor heat exchanger 125 and the indoor heat exchanger 150 based on the current operation being performed by the air conditioning system 100.

In a first configuration (corresponding to a cooling operation), the four-way valve 140 connects the output port of the compressor 135 to a first port of the outdoor air heat exchanger 125 and the input port of the compressor to a first port of the indoor heat exchanger 150. In the first configuration, the compressor 135 receives cool refrigerant from the first port of the indoor heat exchanger 150, compresses the cool refrigerant to generate hot refrigerant, and sends the hot refrigerant to the first port of the outdoor heat exchanger 125 to dissipate heat to the outside air.

In a second configuration (corresponding to a heating operation), the four-way valve 140 connects the input port of the compressor 135 to the first port of the outdoor air heat exchanger 125 and the output port of the compressor to the first port of the indoor heat exchanger 150. In the second configuration, the compressor 135 receives cool refrigerant from the first port of the outdoor heat exchanger 125, compresses the cool refrigerant to generate hot refrigerant, and sends the hot refrigerant to the first port of the indoor heat exchanger 150 to heat the supply air.

The expansion valve 145 is located on one of the refrigerant pipes 120 between the outdoor air heat exchanger 125 and the indoor air heat exchanger 150. It operates to selectively remove pressure from the refrigerant passing between the outdoor air heat exchanger 125 and the indoor air heat exchanger 150, thereby cooling the refrigerant.

During a cooling mode, warm refrigerant passes from a second port of the outdoor heat exchanger 125 and through the expansion valve 145. As the warm refrigerant passes through the expansion valve 145 it loses pressure and thereby loses heat, becoming cold refrigerant, which is provided to a second port of the indoor heat exchanger 150. The cold refrigerant then absorbs heat from the supply air to cool the supply air.

During a heating mode, warm refrigerant passes from the second port of the indoor heat exchanger 150 and through the expansion valve 145. As the warm refrigerant passes through the expansion valve 145 it loses pressure and thereby loses heat, becoming cold refrigerant, which is provided to the second port of the outdoor heat exchanger 125. The cold refrigerant then absorbs heat from outside air.

The outdoor temperature sensor 180 operates to detect a temperature of the outdoor air and provide that temperature to the controller 160. In various embodiments the outdoor temperature sensor 180 can be a digital temperature sensor, though this is by way of example only. Any temperature sensor that can provide an outdoor temperature value to the controller 160 can be used in alternate embodiments. Embodiments in which the controller 160 does not use the outdoor temperature in its control operations can omit the outdoor temperature sensor 180.

The indoor heat exchanger 150 includes a heat exchange coil that operates to exchange heat between refrigerant passing through the indoor heat exchanger 150 and supply air blown over the heat exchange coil in the indoor heat exchanger 150. This allows the refrigerant in the indoor heat exchanger 150 to exchange heat with the supply air, heating or cooling the supply air before the supply air is provided to a room to be heated or cooled. During a heating operation the refrigerant in the indoor heat exchanger 150 will dissipate heat to the supply air to warm the supply air, and during a cooling operation the indoor heat exchanger 150 will absorb heat from the supply air to cool the supply air.

The indoor fan 155 operates to blow the supply air across or through the indoor heat exchanger 150 to allow heat to be exchanged between the refrigerant in the indoor heat exchanger 150 and the supply air. The indoor fan 155 can be located such that it blows air through or across the indoor heat exchanger 150 or such that it draws air across or through the indoor heat exchanger 150. The indoor fan 155 may also serve to blow the conditioned supply air into the indoor area to be heated or cooled.

The indoor temperature sensor 170 operates to detect a temperature of the indoor air inside the area whose air is being conditioned by the indoor unit 115. In various embodiments the indoor temperature sensor 170 can be a digital temperature sensor, though this is by way of example only. Any temperature sensor that can provide an indoor temperature value to the controller 160 can be used in alternate embodiments.

The controller 160 is configured to control the operation of the air conditioning system 100. It can include a processor 163 that generates signals to control the compressor 135, the indoor fan 155 and any other element that requires control signals and a memory 166 that stores information and operation programs.

The processor 163 can be a microprocessor (e.g., a central processing unit), an application-specific integrated circuit (ASIC), or any suitable device for controlling the operation of all or part of the air handler 100.

The memory 166 can include a read-only memory (ROM), a random-access memory (RAM), an electronically programmable read-only memory (EPROM), an electrically erasable programmable read only memory (EEPROM), flash memory, or any suitable memory device.

The communications interface 169 is configured to transmit and receive communications over at least a portion of the air conditioning system. Although it is only shown in FIG. 1 as having signal lines connecting it to the indoor temperature sensor 170 and the outdoor temperature sensor 180, this is simply for ease of disclosure. The communications interface 169 would also have a communication connection to any element in the air conditioning system 100 that requires instructions from the controller 160. This could include, but is not limited to, the outdoor fan 130, the compressor 135, the four-way valve 140, the expansion valve 145, and the indoor fan 155.

This connection could be wired or wireless between the communications interface 169 and any element in the air conditioning system 100 in various embodiments.

Although not shown, the air conditioning system 100 may include air ducts to carry the supply air from the indoor heat exchanger to the indoor area to be heated or cooled.

System Parameters During Operation

FIGS. 2A-2D show the various system parameters of an air conditioning system 100 that uses the disclosed method of controlling the operation of the indoor fan 155 during a cooling operation based on the temperature difference between a current temperature of an indoor space to be cooled $T_C$ and a set point temperature $T_{SET}$ that represents a desired temperature of the area to be cooled. The air conditioning system 100 also controls the speed (frequency) of a compressor 135 during the cooling operation based on the temperature difference between the current temperature of the indoor space to be cooled $T_C$ and the set point temperature $T_{SET}$.

Since the set point temperature $T_{SET}$ can vary during operation of the air conditioning system 100 based on the actions of the operator, the various temperatures shown in FIGS. 2A-2D can also vary. However, for any given implementation, the relative temperature differences between the listed temperatures and the set point temperature $T_{SET}$ will remain the same, even if the set point temperature $T_{SET}$ varies. Therefore, these relative temperature differences between the listed temperatures and the set point temperature $T_{SET}$ are used as triggers for changing parameters of the air conditioning system 100 (e.g., changing the speed of the compressor 135 or the speed of the indoor fan 155). For ease of disclosure, however, the operation of the air conditioning system will sometimes refer to using the various temperatures shown in FIGS. 2A-2D rather than the temperature differences. This should not be interpreted as limiting the disclosed method to using such temperatures in place of the corresponding temperature differences.

Fan Speed

Figure 2A:
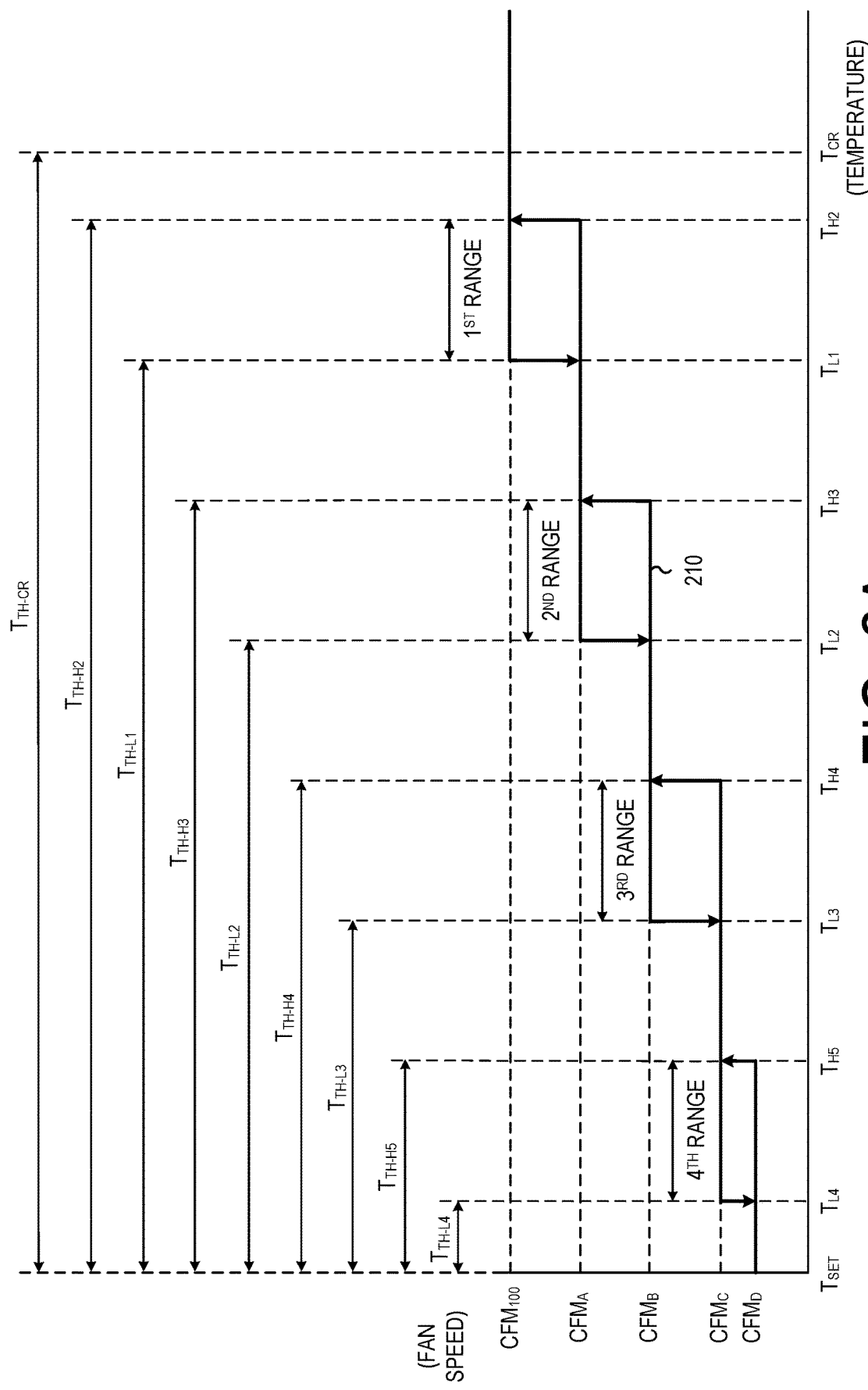
FIG. 2A is a graph of a fan speed of an indoor fan in an air conditioning system versus current indoor temperature during a cooling operation according to disclosed embodiments.

FIG. 2A is a graph 210 of a fan speed of an indoor fan 155 in an air conditioning system 100 versus a current indoor temperature $T_C$ during a cooling operation according to disclosed embodiments. As shown in FIG. 2A, when the temperature of the indoor space is above a compressor change temperature $T_{CR}$ at which the air conditioning system 100 begins to lower the speed (frequency) of the compressor 135, the fan speed of the indoor fan 155 will be at a maximum fan speed $CFM_{100}$. This maximum fan speed $CFM_{100}$ represents a highest normal operating speed of the indoor fan 155 and causes the indoor fan 155 to blow a maximum cubic feet per minute (CFM) of air across or through an indoor heat exchanger 150 and into the indoor space to be cooled.

When the fan speed is at the maximum fan speed $CFM_{100}$, the fan speed can either remain the same or be reduced depending upon how the current temperature $T_C$ compares to a first low temperature $T_{L1}$. The first low temperature $T_{L1}$ is a first low threshold temperature difference $T_{TH-L1}$ above the set point temperature $T_{SET}$.

When the current temperature $T_C$ of the indoor space to be cooled falls below the first low temperature $T_{L1}$, the air conditioning system 100 (e.g., through a controller 160) reduces the speed of the indoor fan 155 to a first reduced fan speed $CFM_A$, which is lower than the maximum fan speed $CFM_{100}$. Otherwise, the fan speed remains at the maximum fan speed $CFM_{100}$.

Once the fan speed has been set at the first reduced fan speed $CFM_A$, the fan speed can go up or down depending upon how the current temperature $T_C$ compares to a second low temperature $T_{L2}$ and a second high temperature $T_{H2}$. The second low temperature $T_{L2}$ is lower than the first low temperature $T_{L1}$ and the second high temperature $T_{H2}$ is higher than the first low temperature $T_{L1}$. The second low temperature $T_{L2}$ is a second low threshold temperature difference $T_{TH-L2}$ above the set point temperature $T_{SET}$; and the second high temperature $T_{H2}$ is a second high threshold temperature difference $T_{TH-H2}$ above the set point temperature $T_{SET}$.

When the current temperature $T_C$ falls below the second low temperature $T_{L2}$, the air conditioning system 100 (e.g., through a controller 160) reduces the speed of the indoor fan 155 to a second reduced fan speed $CFM_B$, which is lower than the first reduced fan speed $CFM_A$. When the current temperature $T_C$ rises above the second high temperature $T_{H2}$, the air conditioning system 100 (e.g., through a controller 160) raises the speed of the indoor fan 155 back to the maximum fan speed $CFM_{100}$.

By having the first low temperature $T_{L1}$ and the second high temperature $T_{H2}$, the air conditioning system provides for hysteresis in the changing of the fan speed between the maximum fan speed $CFM_{100}$ and the first reduced fan speed $CFM_A$, having a first range of temperatures during which the fan speed cannot change after it has been raised or lowered. When the current temperature $T_C$ reaches the first low temperature $T_{L1}$ and the fan speed has been lowered to the first reduced fan speed $CFM_A$, it cannot rise back to the maximum fan speed $CFM_{100}$ until the current temperature $T_C$ rises to the second high temperature $T_{H2}$. Likewise, when the current temperature $T_C$ reaches the second high temperature $T_{H2}$ and the fan speed has been raised to the maximum fan speed $CFM_{100}$, it cannot drop back to the first reduced fan speed $CFM_A$ until the current temperature $T_C$ drops to the first low temperature $T_{L1}$. This prevents the system from constantly changing the fan speed when the current temperature $T_C$ is close to a threshold value.

Once the fan speed has been set at the second reduced fan speed $CFM_B$, the fan speed can go up or down depending upon how the current temperature $T_C$ compares to a third low temperature $T_{L3}$ and a third high temperature $T_{H3}$. The third low temperature $T_{L3}$ is lower than the second low temperature $T_{L2}$ and the third high temperature $T_{H3}$ is higher than the second low temperature $T_{L2}$. The third low temperature $T_{L3}$ is a third low threshold temperature difference $T_{TH-L3}$ above the set point temperature $T_{SET}$; and the third high temperature $T_{H3}$ is a third high threshold temperature difference $T_{TH-H3}$ above the set point temperature $T_{SET}$.

When the current temperature $T_C$ falls below the third low temperature 113, the air conditioning system 100 (e.g., through a controller 160) reduces the speed of the indoor fan 155 to a third reduced fan speed $CFM_C$, which is lower than the second reduced fan speed $CFM_B$. When the current temperature $T_C$ rises above the third high temperature $T_{H3}$, the air conditioning system 100 (e.g., through a controller 160) raises the speed of the indoor fan 155 back to the first reduced fan speed $CFM_A$.

By having the second low temperature $T_{L2}$ and the third high temperature $T_{H3}$, the air conditioning system provides for hysteresis in the changing of the fan speed between the first reduced fan speed $CFM_A$ and the second reduced fan speed $CFM_B$, having a second range of temperatures during which the fan speed cannot change after it has been raised or lowered. When the current temperature $T_C$ reaches the second low temperature $T_{L2}$ and the fan speed has been lowered to the second reduced fan speed $CFM_B$, it cannot rise back to the first reduced fan speed $CFM_A$ until the current temperature $T_C$ rises to the third high temperature $T_{H3}$. Likewise, when the current temperature $T_C$ reaches the third high temperature $T_{H3}$ and the fan speed has been raised to the first reduced fan speed $CFM_A$, it cannot drop back to the second reduced fan speed $CFM_B$ until the current temperature $T_C$ drops to the second low temperature $T_{L2}$. This prevents the system from constantly changing the fan speed when the current temperature $T_C$ is close to a threshold value.

Once the fan speed has been set at the third reduced fan speed $CFM_C$, the fan speed can go up or down depending upon how the current temperature $T_C$ compares to a fourth low temperature 114 and a fourth high temperature $T_{H4}$. The fourth low temperature 114 is lower than the third low temperature $T_{L3}$ and the fourth high temperature $T_{H4}$ is higher than the third low temperature $T_{L3}$. The fourth low temperature 114 is a fourth low threshold temperature difference $T_{TH-L4}$ above the set point temperature $T_{SET}$; and the fourth high temperature $T_{H4}$ is a fourth high threshold temperature difference $T_{TH-H4}$ above the set point temperature $T_{SET}$.

When the current temperature $T_C$ falls below the fourth low temperature 114, the air conditioning system 100 (e.g., through a controller 160) reduces the speed of the indoor fan 155 to a fourth reduced fan speed $CFM_D$, which is lower than the third reduced fan speed $CFM_C$. When the current temperature $T_C$ rises above the fourth high temperature $T_{H4}$, the air conditioning system 100 (e.g., through a controller 160) raises the speed of the indoor fan 155 back to the second reduced fan speed $CFM_B$.

By having the third low temperature $T_{L3}$ and the fourth high temperature $T_{H4}$, the air conditioning system provides for hysteresis in the changing of the fan speed between the second reduced fan speed $CFM_B$ and the third reduced fan speed $CFM_C$, having a third range of temperatures during which the fan speed cannot change after it has been raised or lowered. When the current temperature $T_C$ reaches the third low temperature $T_{L3}$ and the fan speed has been lowered to the third reduced fan speed $CFM_C$, it cannot rise back to the second reduced fan speed $CFM_B$ until the current temperature $T_C$ rises to the fourth high temperature $T_{H4}$. Likewise, when the current temperature $T_C$ reaches the fourth high temperature $T_{H4}$ and the fan speed has been raised to the second reduced fan speed $CFM_B$, it cannot drop back to the third reduced fan speed $CFM_C$ until the current temperature $T_C$ drops to the third low temperature $T_{L3}$. This prevents the system from constantly changing the fan speed when the current temperature $T_C$ is close to a threshold value.

Once the fan speed has been set at the fourth reduced fan speed $CFM_D$, the fan speed can go up or remain the same depending upon how the current temperature $T_C$ compares to a fifth high temperature $T_{H5}$. The fifth high temperature $T_{H5}$ is higher than the fourth low temperature 114. The fifth high temperature $T_{H5}$ is a fifth high threshold temperature difference $T_{TH-H5}$ above the set point temperature $T_{SET}$.

When the current temperature $T_C$ rises above the fifth high temperature $T_{H5}$, the air conditioning system 100 (e.g., through a controller 160) raises the speed of the indoor fan 155 back to the third reduced fan speed $CFM_C$; otherwise the fan speed remains at the fourth reduced fan speed $CFM_D$.

By having the fourth low temperature $T_{L4}$ and the fifth high temperature $T_{H5}$, the air conditioning system provides for hysteresis in the changing of the fan speed between the third reduced fan speed $CFM_C$ and the fourth reduced fan speed $CFM_D$, having a fourth range of temperatures during which the fan speed cannot change after it has been raised or lowered. When the current temperature $T_C$ reaches the fourth low temperature $T_{L4}$ and the fan speed has been lowered to the fourth reduced fan speed $CFM_D$, it cannot rise back to the third reduced fan speed $CFM_C$ until the current temperature $T_C$ rises to the fifth high temperature $T_{H5}$. Likewise, when the current temperature $T_C$ reaches the fifth high temperature $T_{H5}$ and the fan speed has been raised to the third reduced fan speed $CFM_C$, it cannot drop back to the fourth reduced fan speed $CFM_D$ until the current temperature $T_C$ drops to the fourth low temperature $T_{L4}$. This prevents the system from constantly changing the fan speed when the current temperature $T_C$ is close to a threshold value.

The air conditioning system can determine that the current temperature $T_C$ reaches the various low and high temperatures $T_{L1}$, $T_{L2}$, $T_{H2}$, $T_{L3}$, $T_{H3}$, $T_{L4}$, $T_{H4}$, and $T_{H5}$ by storing the various low and high temperatures $T_{L1}$, $T_{L2}$, $T_{H2}$, $T_{L3}$, $T_{H3}$, $T_{L4}$, $T_{H4}$, and $T_{H5}$ and directly comparing the current temperature $T_C$ with the various low and high temperatures $T_{L1}$, $T_{L2}$, $T_{H2}$, $T_{L3}$, $T_{H3}$, $T_{L4}$, $T_{H4}$, and $T_{H5}$. However, since the set point temperature $T_{SET}$ may vary during the operation of the air conditioning system 100, the various low and high temperatures $T_{L1}$, $T_{L2}$, $T_{H2}$, $T_{L3}$, $T_{H3}$, $T_{L4}$, $T_{H4}$, and $T_{H5}$ may likewise vary.

Therefore, the air conditioning system 100 can instead determine that the current temperature $T_C$ reaches the various low and high temperatures $T_{L1}$, $T_{L2}$, $T_{H2}$, $T_{L3}$, $T_{H3}$, $T_{L4}$, $T_{H4}$, and $T_{H5}$ by storing the various high and low threshold temperature differences $T_{TH-L1}$, $T_{TH-L2}$, $T_{TH-H2}$, $T_{TH-L3}$, $T_{TH-H3}$, $T_{TH-L4}$, $T_{TH-H4}$, and $T_{TH-H5}$ that represents the desired difference between the various low and high temperatures $T_{L1}$, $T_{L2}$, $T_{H2}$, $T_{L3}$, $T_{H3}$, $T_{L4}$, $T_{H4}$, and $T_{H5}$ and the set point temperature $T_{SET}$, which relative values should not change during operation. The various threshold temperature differences $T_{TH-L1}$, $T_{TH-L2}$, $T_{TH-H2}$, $T_{TH-L3}$, $T_{TH-H3}$, $T_{TH-L4}$, $T_{TH-H4}$, and $T_{TH-H5}$ can be determined as follows:

$$T_{L1}=T_{SET}+T_{TH-L1} \rightarrow T_{TH-L1}=T_{L1}-T_{SET} \quad \text{(Equation 1)}$$

$$T_{L2}=T_{SET}+T_{TH-L2} \rightarrow T_{TH-L2}=T_{L2}-T_{SET} \quad \text{(Equation 2)}$$

$$T_{H2}=T_{SET}+T_{TH-H2} \rightarrow T_{TH-H2}=T_{H2}-T_{SET} \quad \text{(Equation 3)}$$

$$T_{L3}=T_{SET}+T_{TH-L3} \rightarrow T_{TH-L3}=T_{L3}-T_{SET} \quad \text{(Equation 4)}$$

$$T_{H3}=T_{SET}+T_{TH-H3} \rightarrow T_{TH-H3}=T_{H3}-T_{SET} \quad \text{(Equation 5)}$$

$$T_{L4}=T_{SET}+T_{TH-L4} \rightarrow T_{TH-L4}=T_{L4}-T_{SET} \quad \text{(Equation 6)}$$

$$T_{H4}=T_{SET}+T_{TH-H4} \rightarrow T_{TH-H2}=T_{H4}-T_{SET} \quad \text{(Equation 7)}$$

$$T_{H5}=T_{SET}+T_{TH-H5} \rightarrow T_{TH-H5}=T_{H5}-T_{SET} \quad \text{(Equation 8)}$$

The air conditioning system 100 can then measure the difference between the current temperature $T_C$ and the relevant low or high temperatures $T_{L1}$, $T_{L2}$, $T_{H2}$, $T_{L3}$, $T_{H3}$, $T_{L4}$, $T_{H4}$, and/or $T_{H5}$ and compare this relative temperature difference to the various threshold temperature differences $T_{TH-L1}$, $T_{TH-L2}$, $T_{TH-H2}$, $T_{TH-L3}$, $T_{TH-H3}$, $T_{TH-L4}$, $T_{TH-H4}$, and $T_{TH-H5}$ to decide whether to raise or lower the fan speed independent of the value of the set point temperature $T_{SET}$ and the absolute value of the current temperature $T_C$.

In some embodiments, the compressor reduction temperature $T_{CR}$ will be in the range of 5° F. to 8° F. above the set point temperature $T_{SET}$; the first low temperature $T_{L1}$ will be in the range of 4° F. to 6° F. above the set point temperature $T_{SET}$; the second low temperature 112 will be in the range of 3° F. to 5° F. above the set point temperature $T_{SET}$; the second high temperature $T_{H2}$ will be in the range of 5° F. to 7° F. above the set point temperature $T_{SET}$; the third low temperature 113 will be in the range of 1.5° F. to 3° F. above the set point temperature $T_{SET}$; the third high temperature $T_{H3}$ will be in the range of 3.5° F. to 5° F. above the set point temperature $T_{SET}$; the fourth low temperature 114 will be in the range of 0.5° F. to 1.5° F. above the set point temperature $T_{SET}$; the fourth high temperature $T_{H4}$ will be in the range of 2.5° F. to 3.5° F. above the set point temperature $T_{SET}$; and the fifth high temperature $T_{H5}$ will be in the range of 1° F. to 2° F. above the set point temperature $T_{SET}$. However, these values are by way of example only. Other threshold values can be used in alternate embodiments.

In the embodiment of FIG. 2A, the first reduced fan speed $CFM_A$ is 80% of total fan speed, the second reduced fan speed $CFM_B$ is 60% of total fan speed, the third reduced fan speed $CFM_C$ is 40% of total fan speed, and the fourth reduced fan speed CFM D is 30% of total fan speed. In this way, there are four steps between fan speeds, and each step is between 10% and 20%.

However, this is by way of example only. Alternate embodiments could have more or fewer steps in reducing fan speed and could use larger or smaller steps between adjacent fan speeds. In some embodiments the step sizes can all be the same, while in other embodiments the step sizes can be partly or wholly different.

Although FIG. 2A shows an embodiment in which four reduced fan speeds $CFM_A$, $CFM_B$, $CFM_C$, and $CFM_D$ are used, this is by way of example only. Different embodiments could use more or fewer reduced fan speeds, having more or fewer than five possible fan speeds. Systems with three to seven steps will provide good performance, though the design is not limited to this range.

Compressor Frequency

Figure 2B:
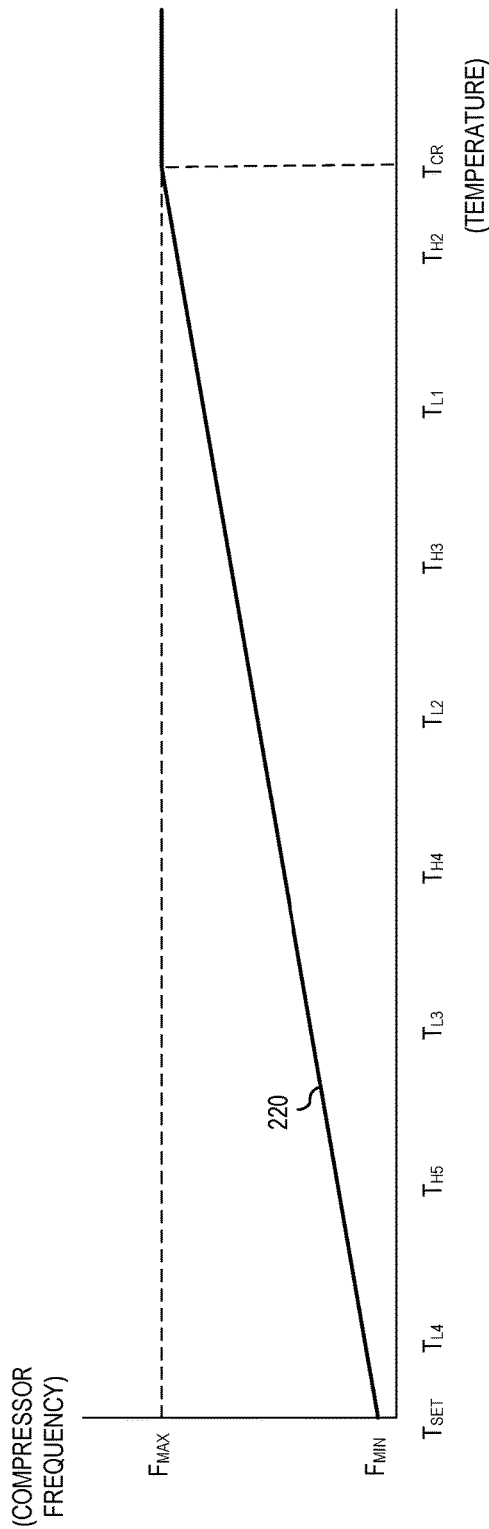
FIG. 2B is a graph of a compressor frequency in an air conditioning system versus current indoor temperature according to disclosed embodiments.

FIG. 2B is a graph 220 of a compressor frequency in an air conditioning system 100 versus a current indoor temperature $T_C$ during a cooling operation according to disclosed embodiments. As shown in FIG. 2B, the air conditioning system 100 (e.g., through its controller 160) lowers the frequency of rotation of the compressor 135, thereby lowering the speed of the compressor 135, starting when the temperature reaches a compressor reduction temperature $T_{CR}$. The compressor reduction temperature $T_{CR}$ is higher than the second high temperature $T_{H2}$. The compressor reduction temperature $T_{CR}$ is a compressor reduction threshold $T_{TH-CR}$ above the set point temperature $T_{SET}$.

Since the compressor reduction temperature $T_{CR}$ is higher than the second high temperature $T_{H2}$, the modification of the speed of the indoor fan 155 will only occur during a time when the air conditioning system 100 has reduced the speed (frequency) of the compressor 135.

When the current temperature $T_C$ drops below the compressor reduction temperature $T_{CR}$, the air conditioning system 100 begins to drop the frequency of the compressor 135. In this embodiment the reduction is generally linear, i.e., with a reduction that descends at a constant rate over time. The reduction of the frequency of the compressor can be stepwise and with hysteresis in a manner like the reduction of the indoor fan 155. In such a case, the size of the steps may be constant over the course of the frequency reduction.

Although not described in detail, the value of the compressor frequency will vary based on how much the current temperature $T_C$ differs from the set point temperature $T_{SET}$. Above the compressor reduction temperature $T_{CR}$ the compressor frequency will be at a maximum. Between the compressor reduction temperature $T_{CR}$ and set point temperature $T_{SET}$ the frequency of the compressor will become lower (to a minimum frequency) the closer the current temperature $T_C$ gets to the set point temperature $T_{SET}$, and the frequency of the compressor will become higher the farther the current temperature $T_C$ moves from the set point temperature $T_{SET}$.

At the maximum frequency, the compressor 135 is rotating at its maximum speed and has a maximum capacity. At this maximum capacity, the compressor 135 is providing a maximum amount of compression to the refrigerant as it passes though the compressor 135, allowing a maximum amount of heat to be dissipated to the outside air through the outdoor heat exchanger 125 during the cooling operation and making the refrigerant passing through the indoor heat exchanger 150 cooler.

As the frequency of the compressor 135 is lowered, the compressor will rotate correspondingly slower with a commensurate lowering of its capacity. As the capacity of the compressor goes down, the amount that the refrigerant is compressed as it passes though the compressor 135 is likewise reduced. The lower the frequency of the compressor, the lower the heat of the refrigerant exiting the compressor 135 and passing through the outdoor heat exchanger 125, the lower the heat to be dissipated to the outside air through the outdoor heat exchanger 125, and the higher the temperature of the refrigerant passing through the indoor heat exchanger 150.

This feedback relationship allows the air conditioning system 100 to slowly reduce its cooling capacity, ideally reaching an equilibrium point when the current temperature $T_C$ reaches the set point temperature $T_{SET}$. At this equilibrium point, the amount of cooling provided by the indoor heat exchanger 150 will be just sufficient to maintain the indoor space at the set point temperature $T_{SET}$ without making the indoor space too cold.

Of course, as air conditioning loads change, the current temperature $T_C$ may go up rather than down. In such a case, the air conditioning system (e.g., through its controller 160) will raise the frequency of the compressor 135 to provide greater cooling until such a time as that greater cooling causes the current temperature $T_C$ to drop again.

In embodiments in which the change in compressor frequency is stepwise, the number of steps for reducing the compressor frequency will typically be greater than the number of steps for reducing the fan speed. For example, having ten to twenty steps for reducing the frequency of the compressor 135 will provide good performance, though the design is not limited to this range. In some embodiments, the size of the step of reducing the frequency of the compressor 135 will be between 5% and 10% of the maximum frequency of the compressor 135, though the design is not limited to this range.

A typical ratio of steps in changing the compressor frequency and steps in changing the fan speed will be between 2:1 and 5:1, though the design is not limited to this range.

System Capacity

Figure 2C:
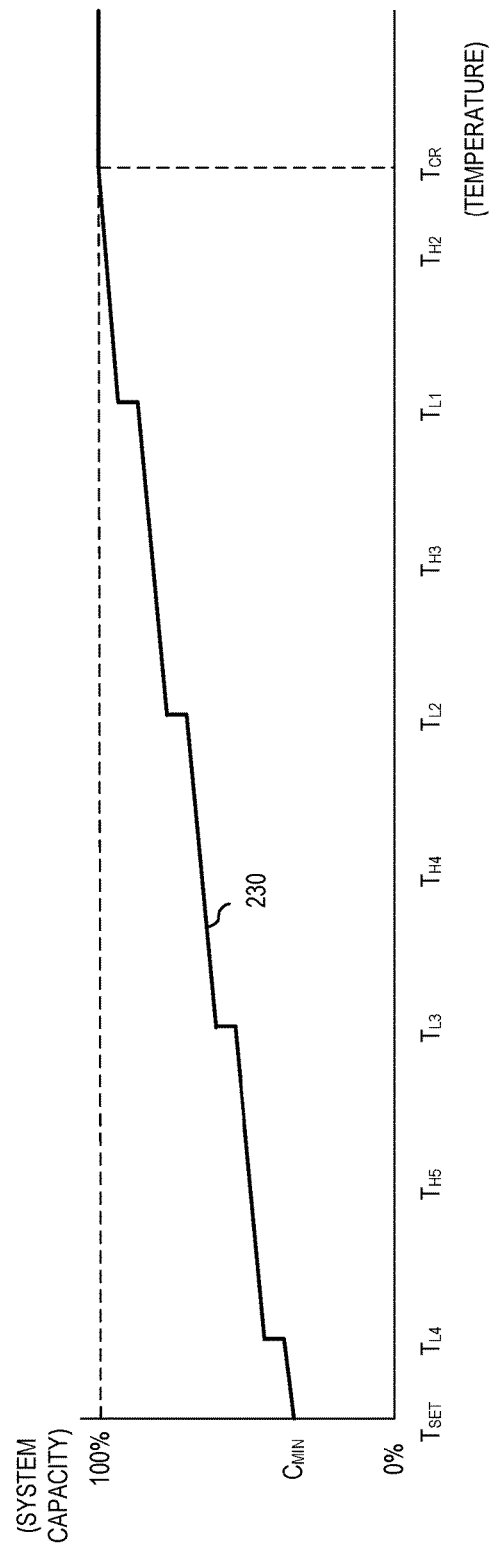
FIG. 2C is a graph of system capacity in an air conditioning system versus current indoor temperature during a cooling operation according to disclosed embodiments.

FIG. 2C is a graph 230 of system capacity in an air conditioning system 100 versus a current indoor temperature $T_C$ during a cooling operation according to disclosed embodiments. During the cooling operation, this system capacity represents the total percentage of a maximum cooling capacity of the air conditioning system, i.e., the ability of the system to cool the indoor space.

The system capacity of an air conditioning system (for cooling or heating) is typically presented in terms of BTUs per hour (often abbreviated as simply "BTUs") that are available for cooling or heating the indoor space. For the purposes of this disclosure, the system capacity value represents a percentage of a maximum system capacity for the air conditioning system 100. For example, if the maximum system capacity of an air conditioning system 100 was 40,000 BTU/hour, then a system capacity of 100% would represent 40,000 BTU/hour, while a system capacity of 80% would represent 32,000 BTU/hour, and so on.

As shown in FIG. 2C, once the air conditioning system 100 begins lowering the frequency of the compressor 135 at the compressor reduction temperature $T_{CR}$, the system capacity begins to fall for the reasons given above in the discussion of the compressor frequency.

Absent any control of the speed of the indoor fan 155, the drop in system capacity would be comparable to the drop in the frequency of the compressor 135. FIG. 3A is a graph 330 of system capacity in an air conditioning system 100 versus a current indoor temperature $T_C$ during a cooling operation without the fan control of FIG. 2A.

As shown in FIG. 3A, in a system that does not control the speed of the indoor fan 155, the system capacity drops in a generally linear fashion starting at the compressor reduction temperature $T_{CR}$. This linear drop is comparable to the linear drop of the compressor frequency. When the frequency of the compressor 135 goes down, the system capacity goes down by a comparable amount; and when the frequency of the compressor 135 goes up, the system capacity goes up by a comparable amount.

However, when the speed of the indoor fan 155 is controlled as shown in FIG. 2A, the graph 330 of system capacity does not exactly correspond to the graph 210 of compressor frequency. Because the speed of the indoor fan 155 is being controlled in tandem with the frequency of the compressor 135 and both these parameters can alter the system capacity, the system capacity will behave in a more nuanced fashion.

As shown in FIG. 2C, between the compressor reduction temperature $T_{CR}$ and the first low temperature $T_{L1}$, the drop in system capacity will correspond to the drop in the frequency of the compressor 135. At this point, the indoor fan 155 is still operating at full speed.

But when the indoor temperature $T_C$ reaches the first low temperature $T_{L1}$, the air conditioning system 100 will lower the fan speed from the maximum fan speed $CPM_{100}$ to the first reduced fan speed $CPM_A$. This will cause the indoor fan 155 to force less supply air across or through the indoor heat exchanger 150. Less supply air passing across or through the indoor heat exchanger 150 means less heat exchanged between the supply air and the refrigerant in the indoor heat exchanger 150, which will cause a temperature of the refrigerant (i.e., a coil temperature) in the indoor heat exchanger 150 to go down. At the same time, lowering the speed of the indoor fan 155 will cause a drop in the system capacity because less heat is being exchanged between supply air and refrigerant in the indoor heat exchanger 150.

This drop in system capacity will result in a drop in the cooling effectiveness of the air conditioning system 100, which may cause the current temperature $T_C$ to rise. In such a case, a rise in the current temperature $T_C$ will likewise cause the air conditioning system 100 to increase the frequency of the compressor 135 to increase the system capacity, making the refrigerant passing through the indoor heat exchanger 150 cooler. However, given the hysteresis in the control of the speed of the indoor fan 155, this increase in the frequency of the compressor 135 will not immediately increase the speed of the indoor fan 155.

Over time, the increased system capacity caused by the increased frequency of the compressor 135 should cause the system capacity to reach the level it was at when the speed of the indoor fan 155 was reduced and the current temperature $T_C$ will begin to drop once again. So long as this occurs before the temperature reaches the second high temperature $T_{H2}$, the fan speed will remain at the first reduced fan speed $CFM_A$.

In this way, the system capacity will be reduced along with the reduction of the speed of the compressor 135, though the reduction won't be directly comparable to the drop in the frequency of the compressor 135.

Sensible Heat Factor

FIG. 2D is a graph 240 of a sensible heat factor (SHF) in an air conditioning system 100 versus a current indoor temperature $T_C$ during a cooling operation according to disclosed embodiments. The SHF refers to the percentage of system capacity that causes the supply air to be cooled. This contrasts to the latent heat factor (LHF), which refers to the percentage of system capacity that causes moisture to be removed from the supply air. The SHF and the LHF sum to 100%, so a reduction in the SHF corresponds to an increase in the LHF and vice versa.

As shown in FIG. 2D, the SHF rises as the frequency of the compressor 135 is reduced but drops each time the speed of the indoor fan 155 is reduced. As a result, the graph 240 of the SHF of the air conditioning system 100 is a series of gradual increases interspersed with a series of dramatic drops. In general, this causes the SHF to trend downward.

The SHF rises as the frequency of the compressor 135 is reduced because a drop in the frequency of the compressor 135 causes the temperature of the refrigerant in the indoor heat exchanger 150 to increase (i.e., a coil temperature of the indoor heat exchanger 150 will increase), requiring more of the system capacity to reduce the temperature (increasing the SHF) and causing the indoor heat exchanger 150 to remove less moisture from the supply air (reducing the LHF).

If the speed of the indoor fan 155 were kept constant, this rise in the SHF would continue until the SHF reached 1.00 (i.e., 100%) at which point it could not rise any higher. The LHF would necessarily drop to 0.00 (i.e., 0%) in this situation, meaning that the indoor heat exchanger would no longer remove any moisture from the supply air.

FIG. 3B is a graph 340 of a sensible heat factor (SHF) in an air conditioning system 100 versus a current indoor temperature $T_C$ during a cooling operation without the fan control of FIG. 2A. As shown in FIG. 3B, the SHF begins rising from a starting point (e.g., between 0.80 and 0.90) until it reaches 1.00 at some point before the current temperature $T_C$ reaches the set point temperature $T_{SET}$ (i.e., at a 100% SHF temperature $T_{SHF-100}$).

In such a situation, the only way for an operator to get the air conditioning system 100 to remove any moisture from the supply air would be to lower the set point temperature $T_{SET}$ to an artificially low value such that the 100% SHF temperature $T_{SHF-100}$ would be lower than the desired temperature for the indoor space and the LHF at the desired temperature would be greater than zero. But this option requires the operator to set the set point temperature $T_{SET}$ lower than a desired indoor temperature. This, in turn, requires the operator to monitor the current temperature $T_C$ to manually increase the set point temperature $T_{SET}$ when the current temperature $T_C$ reaches a desired indoor temperature, lest the air conditioning system continue to cool the indoor space making it colder than desired. Such a result would waste energy and discomfort the people in the indoor space.

However, as shown in FIG. 2D, the SHF drops each time the speed of the indoor fan 155 is reduced. This is because a drop in the speed of the indoor fan 155 causes less supply air to pass over or through the indoor heat exchanger 150, resulting in less heat being exchanged between the supply air and the refrigerant in the indoor heat exchanger 150, and lowering the temperature of the refrigerant in the indoor heat exchanger 150 (i.e., lowering its coil temperature). This reduces the total capacity of the air conditioning system 100 but increases its LHF because the coil in the indoor heat exchanger 150, and therefore the conditioned supply air, becomes colder when airflow is reduced.

By reducing the speed of the indoor fan 155 along with reducing the speed (frequency) of the compressor 135, the disclosed air conditioning system and method can balance out the rise in SHF for the system caused by the reduction in the frequency of the compressor 135 with the decrease in SHF caused by the decrease in fan speed. By choosing the proper parameters, the system can arrange for the decrease in SHF caused by the decrease in fan speed to outweigh the rise in SHF for the system caused by the reduction in the frequency of the compressor 135, resulting in a generally downward movement of the SHF.

As shown in FIG. 2D, while the SHF for the system rises as the frequency of the compressor 135 is reduced, then drops in SHF when the speed of the indoor fan 155 is reduced causes a reduction in SHF that is greater than the rise in SHF since the last change in fan speed. As a result, the SHF generally trends downward over time, allowing for greater LHF and more moisture removal from the supply air.

EXAMPLE

Consider an exemplary embodiment in which the set point temperature $T_{SET}$ in a cooling operation is 74° F., the current temperature $T_C$ is 78° F., the second low temperature 112 is 78° F., the second low threshold temperature difference $T_{TH-L2}$ is 4° F., the first reduced fan speed $CFM_A$ is 80% of maximum, and the second reduced fan speed $CFM_B$ is 60% of maximum. As the current temperature $T_C$ approaches 78° F., but before the fan speed is reduced, the cooling capacity of the air conditioning system is 20,000 BTU/hour, which represents 50% of maximum cooling capacity.

A controller 160 receives a measure of the current temperature $T_C$ (78° F.) and subtracts the set point temperature $T_{SET}$ (74° F.) from this value to obtain a current temperature difference TD (4° F.). It then compares this temperature difference TD with the second low threshold temperature difference $T_{TH-L2}$ and based on this comparison reduces the speed of the indoor fan 155 from the first reduced fan speed $CFM_A$ to the second reduced fan speed $CFM_B$. The temperature of the refrigerant in the indoor heat exchanger 150 is correspondingly reduced.

Because of the reduction of the fan speed to the second reduced fan speed $CFM_B$, the cooling capacity of the air conditioning system 100 is reduced from 20,000 BTU/hour to 18,000 BTU/hour. As a result of this reduction in cooling capacity, the current temperature $T_C$ rises by half a degree up to 78.5° F., which causes the controller 160 to increase the frequency of the compressor 135 to increase the system's cooling capacity. In time, as the frequency of the compressor 135 is increased, the cooling capacity of the air conditioning system 100 will return to 20,000 BTU/hour and bring the current temperature $T_C$ back to 78° F.

However, when the cooling capacity of the air conditioning system 100 returns to 20,000 BTU/hour, the temperature of the refrigerant in the indoor heat exchanger 150 will still be lower than it was before the speed of the indoor fan 155 was reduced from the first reduced fan speed $CFM_A$ to the second reduced fan speed $CFM_B$. As a result, the SHF of the air conditioning system 100 will be lower and the LHF of the air conditioning system 100 will be higher, meaning that the air conditioning system 100 will be better able to extract moisture from the supply air as it passes over or through the indoor heat exchanger 150.

The same thing will happen each time the speed of the indoor fan 155 is reduced. In each case, the cooling capacity will drop because of the reduced fan speed, the frequency of the compressor 135 will be increased to compensate, and when the cooling capacity returns to its previous value, the refrigerant in the indoor heat exchanger 150 will be cooler than it was prior to the speed of the indoor fan being reduced, allowing for an increase in the LHF.

The specific values used above are exemplary only and should not be considered as limiting the scope of the disclosure in any way. Alternate values of any of these parameters may be used in alternate embodiments.

Method of Operation

FIGS. 4A-4D are a flow chart 400A, 400B, 400C, 400D showing the operation for controlling the speed of a fan in an air conditioning system according to disclosed embodiments. This fan can be an indoor fan associated with an indoor heat exchanger that serves to cool an indoor space during a cooling operation.

Figure 4A:
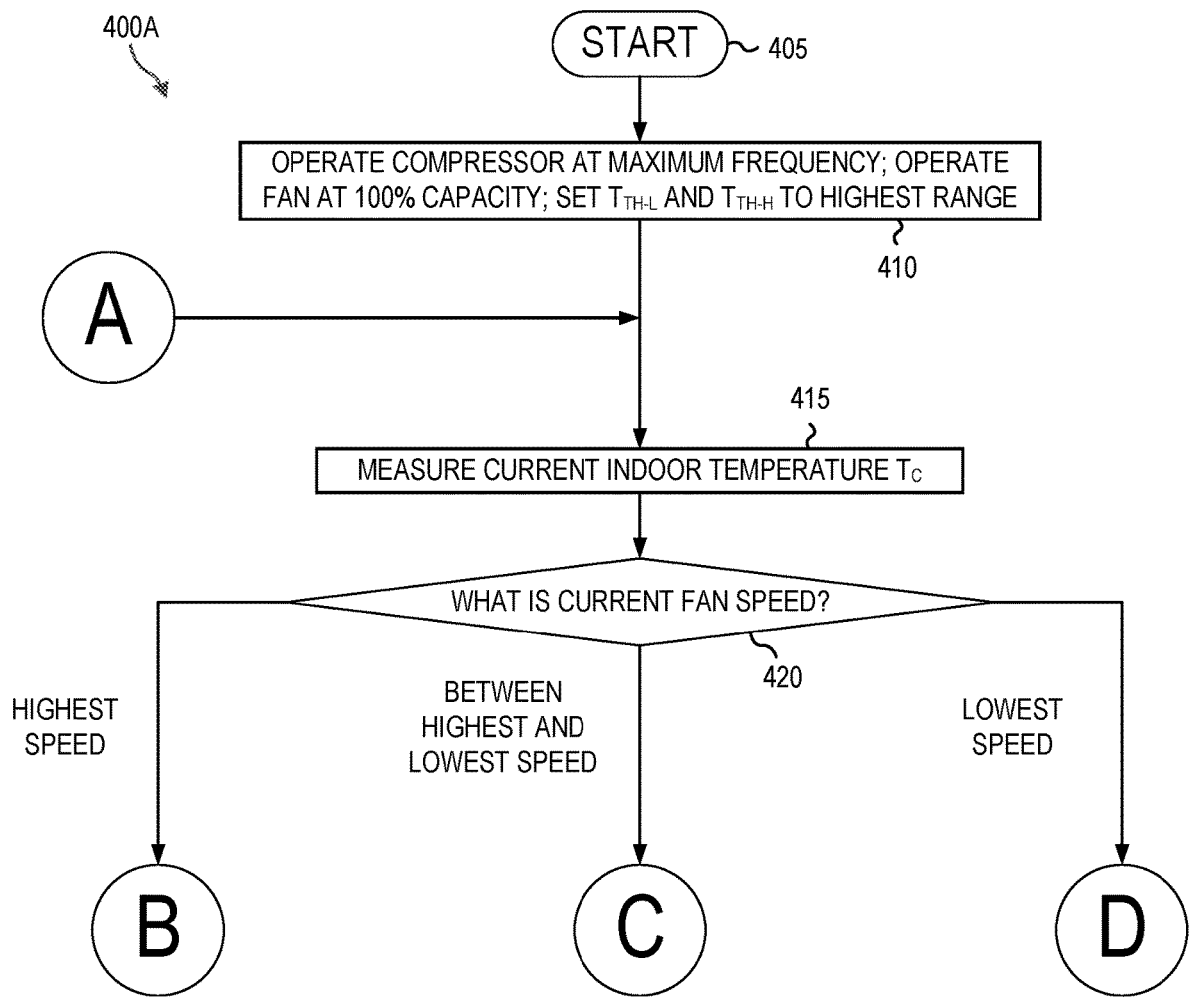
FIGS. 4A-4D are a flow chart showing the operation for controlling the speed of a fan in an air conditioning system according to disclosed embodiments.

As shown in FIG. 4A, when a cooling operation commences and the operation of controlling the speed of the fan begins, the air conditioning system operates a compressor at maximum frequency; operates an indoor fan at 100% capacity; and sets both a low temperature difference threshold $T_{TH-L}$ and a high temperature difference threshold $T_{TH-H}$ at their maximum values (410)

The low temperature difference threshold $T_{TH-L}$ represents the temperature difference between the current indoor temperature $T_C$ and the set point temperature $T_{SET}$ at which the system will reduce the speed of the fan, and the high temperature difference threshold $T_{TH-H}$ represents the temperature difference between the current indoor temperature $T_C$ and the set point temperature $T_{SET}$ at which the system will increase the speed of the fan.

Each available fan speed value has its own corresponding values for the low temperature difference threshold $T_{TH-L}$ and the high temperature difference threshold $T_{TH-H}$ because the temperature differences at which the fan speed goes up or down a step are different for each possible fan speed value. Since the speed of the fan cannot increase above 100% capacity, the value for the high temperature difference threshold $T_{TH-H}$ associated with the highest fan speed will either not exist or will be a null value. Likewise, since the system will not reduce the fan speed below a given minimum speed, the value for the low temperature difference threshold $T_{TH-L}$ associated with the lowest fan speed will either not exist or will be a null value. Thus, the high temperature difference threshold $T_{TH-H}$ initially stored in operation 410 (which corresponds to the highest fan speed value) may be omitted or may be a null value.

Once the starting parameters are set (410), the system measures the current indoor temperature $T_C$ (415). This may be done using a temperature sensor in an indoor unit, a temperature sensor attached to the outside of an indoor unit, a temperature sensor located in the indoor space, or via any appropriate manner of temperature measurement.

The system behaves differently depending upon whether the current fan speed is the highest speed, the lowest speed, or between the highest speed and the lowest speed. If the current fan speed is the highest speed, it can only be decreased and cannot be increased; if the fan speed is the lowest speed, it can only be increased and cannot be decreased; and if the fan speed is between the highest speed and the lowest speed, it can be either increased or decreased.

The system then determines which category the fan speed is in to determine how to proceed (420). This operation may be an explicit determination of the category of the fan speed but need not be. In some embodiments this operation may involve observing the low temperature difference threshold $T_{TH-L}$ and the high temperature difference threshold $T_{TH-H}$ to determine if either is missing or a null value. A missing or null value for the low temperature difference threshold $T_{TH-L}$ indicates that the fan is operating at its lowest speed; a missing or null value for the high temperature difference threshold $T_{TH-H}$ indicates that the fan is operating at its highest speed; and both the low temperature difference threshold $T_{TH-L}$ and the high temperature difference threshold $T_{TH-H}$ having valid values indicates that the fan is operating between the highest and lowest speeds.

Figure 4B:
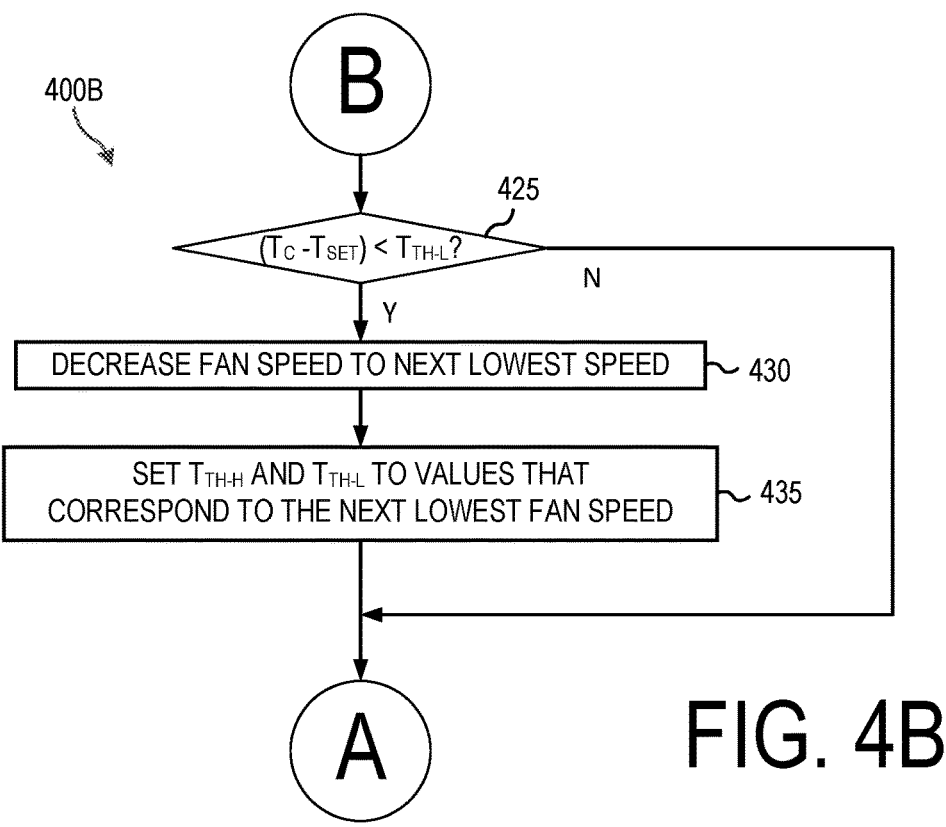

As shown in FIG. 4B, if it is determined that the fan is operating at its highest speed (420), the system then determines whether the difference between the current indoor temperature $T_C$ and the set point temperature $T_{SET}$ is lower than the currently saved low temperature difference threshold $T_{TH-L}$ (425).

If the difference between the current indoor temperature $T_C$ and the set point temperature $T_{SET}$ is lower than the currently saved low temperature difference threshold $T_{TH-L}$, the system decreases the speed of the fan to the next lowest speed (430) and sets the low temperature difference threshold $T_{TH-L}$ and the high temperature difference threshold $T_{TH-H}$ to the values that correspond to the new fan speed (435).

Processing then returns to measuring the current indoor temperature $T_C$ (425). In various embodiments the measurement of the current indoor temperature $T_C$ may be continually performed, may be periodically performed according to a set delay, or may be performed upon command.

If the difference between the current indoor temperature $T_C$ and the set point temperature $T_{SET}$ is not lower than the currently saved low temperature difference threshold $T_{TH-L}$, the system takes no action with respect to the fan speed and simply returns to measuring the current indoor temperature $T_C$ (415).

Figure 4D:
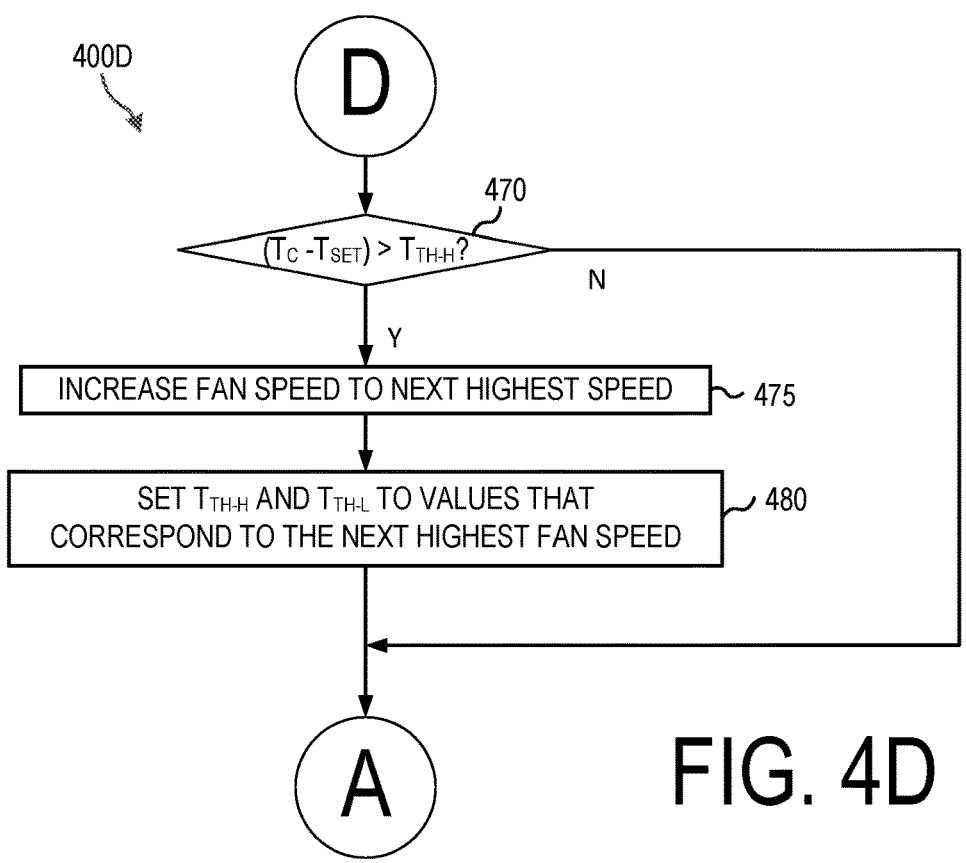
Figure 4C:
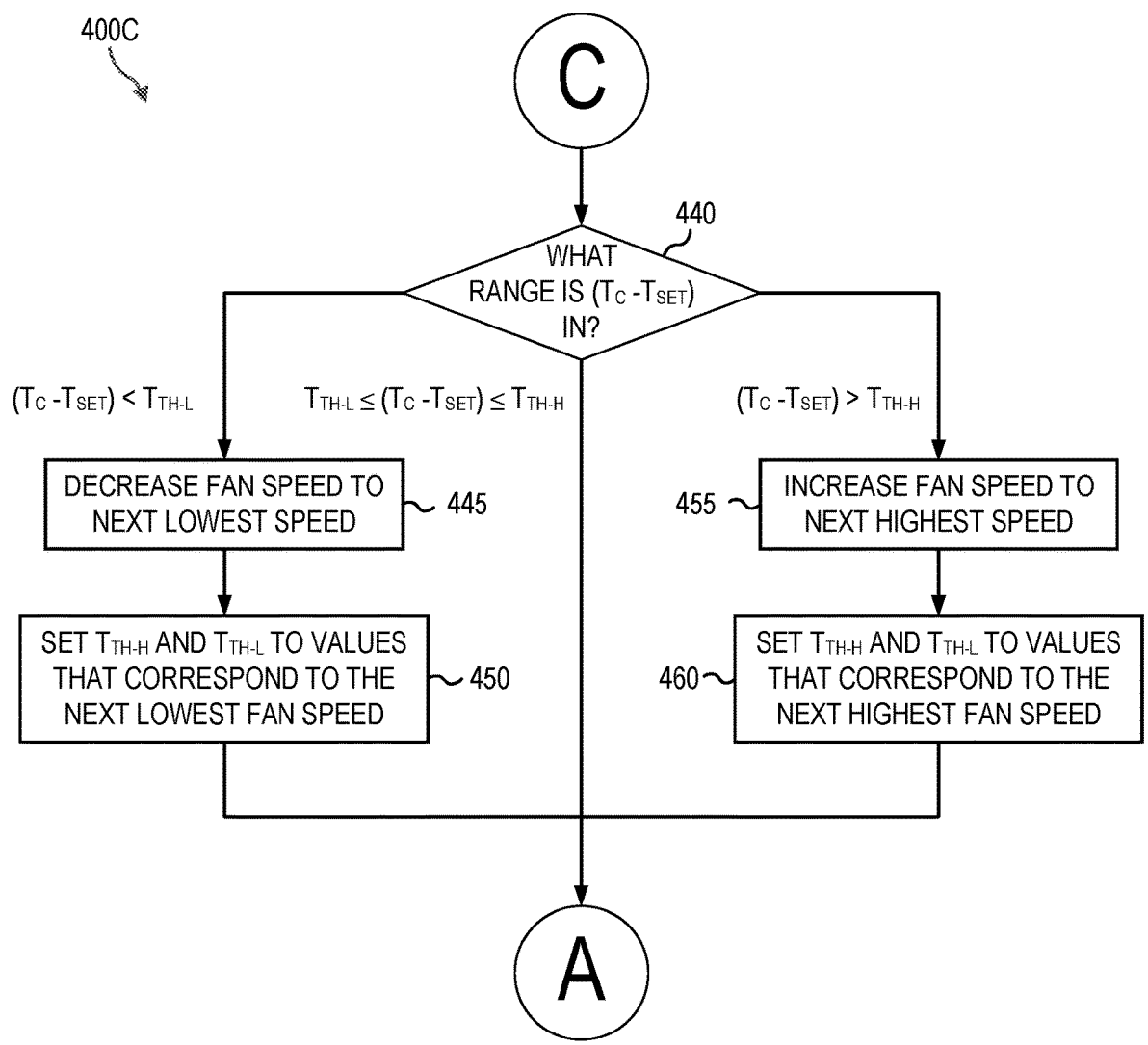

As shown in FIG. 4C, if it is determined that the fan is operating between its highest speed and its lowest speed (420), the system then determines whether the difference between the current indoor temperature $T_C$ and the set point temperature $T_{SET}$ is: (1) lower than the currently saved low temperature difference threshold $T_{TH-L}$ [$(T_C-T_{SET})<T_{TH-L}$]; (2) higher than the currently saved high temperature difference threshold $T_{TH-H}$ [$(T_C-T_{SET})>T_{TH-H}$]; or (3) between the currently saved low temperature difference threshold $T_{TH-L}$ and the currently saved high temperature difference threshold $T_{TH-H}$ [$T_{TH-L} \leq (T_C-T_{SET}) \leq T_{TH-H}$].

If the difference between the current indoor temperature $T_C$ and the set point temperature $T_{SET}$ is lower than the currently saved low temperature difference threshold $T_{TH-L}$ [$(T_C-T_{SET})<T_{TH-L}$], the system decreases the speed of the fan to the next lowest speed (445) and sets the low temperature difference threshold $T_{TH-L}$ and the high temperature difference threshold $T_{TH-H}$ to the values that correspond to the new fan speed (450).

Processing then returns to measuring the current indoor temperature $T_C$ (415). In various embodiments the measurement of the current indoor temperature $T_C$ may be continually performed, may be periodically performed according to a set delay, or may be performed upon command.

If the difference between the current indoor temperature $T_C$ and the set point temperature $T_{SET}$ is greater than the currently saved high temperature difference threshold $T_{TH-H}$ [$(T_C-T_{SET})>T_{TH-H}$], the system increases the speed of the fan to the next highest speed (455) and sets the low temperature difference threshold $T_{TH-L}$ and the high temperature difference threshold $T_{TH-H}$ to the values that correspond to the new fan speed (460).

Processing then returns to measuring the current indoor temperature $T_C$ (415). In various embodiments the measurement of the current indoor temperature $T_C$ may be continually performed, may be periodically performed according to a set delay, or may be performed upon command.

If the difference between the current indoor temperature $T_C$ and the set point temperature $T_{SET}$ is between the low temperature difference threshold $T_{TH-L}$ and the high temperature difference threshold $T_{TH-H}$ [$T_{TH-L} \leq (T_C-T_{SET}) \leq T_{TH-H}$], the system takes no action with respect to the fan speed and simply returns to measuring the current indoor temperature $T_C$ (415).

As shown in FIG. 4D, if it is determined that the fan is operating at its lowest speed (420), the system then determines whether the difference between the current indoor temperature $T_C$ and the set point temperature $T_{SET}$ is greater than the currently saved high temperature difference threshold $T_{TH-H}$ (470).

If the difference between the current indoor temperature $T_C$ and the set point temperature $T_{SET}$ is greater than the currently saved high temperature difference threshold $T_{TH-H}$, the system increases the speed of the fan to the next highest speed (475) and sets the low temperature difference threshold $T_{TH-L}$ and the high temperature difference threshold $T_{TH-H}$ to the values that correspond to the new fan speed (480).

Processing then returns to measuring the current indoor temperature $T_C$ (415). In various embodiments the measurement of the current indoor temperature $T_C$ may be continually performed, may be periodically performed according to a set delay, or may be performed upon command.

If the difference between the current indoor temperature $T_C$ and the set point temperature $T_{SET}$ is not greater than the high temperature difference threshold $T_{TH-H}$, the system takes no action with respect to the fan speed and simply returns to measuring the current indoor temperature $T_C$ (415).

In this way, the fan speed is changed appropriately as the current indoor temperature $T_C$ changes, as are the low temperature difference threshold $T_{TH-L}$ and the high temperature difference threshold $T_{TH-H}$, which are changed to correspond to the current fan speed.

Although FIGS. 4A-4D identify that determinations are made based on temperature differences being lower than the low temperature difference threshold $T_{TH-L}$ (<), greater than the high temperature difference threshold $T_{TH-H}$ (>), and between the low temperature difference threshold $T_{TH-L}$ and the high temperature difference threshold $T_{TH-H}$ ($\leq$), the use of "lower than," "greater than," "lower than or equal to," and "greater than or equal to" is by way of example only. How the system reacts when a measured temperature difference is exactly equal to a stored threshold value is a matter of design choice and will not substantially change the operation of the fan speed control method.

Although FIGS. 4B, 4C, and 4D show different operations depending upon whether the fan speed is at its highest value, its lowest value, or between its highest value and its lowest value, alternate embodiments could simplify this operation 420 and only performing operations 445-460 after operation 415.

In such an embodiment, operation 440 would have to be modified such that it eliminated the option of determining that the difference between the current indoor temperature $T_C$ and the set point temperature $T_{SET}$ is lower than the currently saved low temperature difference threshold $T_{TH-L}$ [$(T_C-T_{SET})<T_{TH-L}$] when the fan speed is at its lowest speed. Instead, operation 440 would determine that the difference between the current indoor temperature $T_C$ and the set point temperature $T_{SET}$ is between the currently saved low temperature difference threshold $T_{TH-L}$ and the currently saved high temperature difference threshold $T_{TH-H}$ [$T_{TH-L} \leq (T_C-T_{SET}) \leq T_{TH-H}$] if it is not higher than the currently saved high temperature difference threshold $T_{TH-H}$.

Similarly, operation 440 would have to be modified such that it eliminated the option of determining that the difference between the current indoor temperature $T_C$ and the set point temperature $T_{SET}$ is higher than the currently saved high temperature difference threshold $T_{TH-H}$ [$(T_C-T_{SET})>T_{TH-H}$] when the fan speed is at its highest speed. Instead, operation 440 would determine that the difference between the current indoor temperature $T_C$ and the set point temperature $T_{SET}$ is between the currently saved low temperature difference threshold $T_{TH-L}$ and the currently saved high temperature difference threshold $T_{TH-H}$ [$T_{TH-L} \leq (T_C-T_{SET}) \leq T_{TH-H}$] if it is not lower than the currently saved low temperature difference threshold $T_{TH-L}$.

In some embodiments, the method 400A, 400B, 400C, 400D can be implemented by providing a non-transitory computer-readable medium (e.g., the memory 166) with instructions for execution by a computer (e.g., the processor 163). These instructions can include a computer-implemented method for controlling operation of an indoor fan configured to blow air through the indoor heat exchanger in an air conditioning system.

In some embodiments, the method 400A, 400B, 400C, 400D can be implemented by a computer system (e.g., the controller 160) configured to control the operation of an indoor fan that blows air through an indoor heat exchanger in an air conditioning system. This computer system can include: a communications interface (e.g., computer interface 169) operable to transmit and receive communications over at least a portion of the air conditioning system; a memory (e.g., memory 166) configured to store data and instructions; and a processor (e.g., processor 163) cooperatively operable with the communications interface and the memory. The elements of the computer system can be configured to facilitate the method disclosed in FIGS. 4A-4D.

Furthermore, although FIGS. 4A-4D describe only the control of a fan speed, the method could also operate to control the frequency of a compressor in the air conditioning system in tandem with the control of the fan speed. These two control processes would work together to maintain a desired level of performance for the air conditioning system. Each change in fan speed or compressor frequency would influence the system operation and therefore the current indoor temperature $T_C$, which in turn would influence the control of the fan speed and compressor frequency. By adjusting these two parameters in tandem, the method can provide a more advantageous performance compared to control of only one of these parameters.

However, both control of the fan speed and control of the compressor frequency will be controlled based on the current indoor temperature $T_C$ and the difference between the current indoor temperature $T_C$ and the set point temperature $T_{SET}$. As a result, even though each parameter will indirectly influence the other, neither will be directly influenced by the other. Their individual operations can therefore be shown solely as functions of the current indoor temperature $T_C$ and/or the difference between the current indoor temperature $T_C$ and the set point temperature $T_{SET}$.

ALTERNATE EMBODIMENTS

Although the description above describes the speed (frequency) of the compressor 135 and the speed of the indoor fan 155 as being dependent solely upon the indoor temperature $T_C$ as a variable, this is only by way of example. Alternate embodiments could use other variable parameters to control operation of the system. For example, a measure of outdoor temperature could be used in the control of the air conditioning system 100. In one embodiment, the outside air temperature could be used to change the step size for altering either or both of the compressor speed or the fan speed. Other variations and other variables could be used on other embodiments.

In addition, although the above examples show that the speed (frequency) of the compressor is reduced in a generally linear manner, this is by way of example only. Alternate embodiments could use a non-linear variation of compressor speed (frequency) versus the current temperature $T_C$. For example, in some embodiments the change in the speed (frequency) of the compressor 135 could get faster or slower as the current temperature $T_C$ approaches the set point temperature $T_{SET}$.

Also, although the above examples show that the amounts that the fan speed is stepped down are the same as the amounts that the fan speed is stepped up, this is by way of example only. In some embodiments the fan speed could be stepped down slower or quicker than it is stepped up. For example, the fan speed could step down in increments of 20% but step up in increments of 10%, with each step up having a different threshold temperature. This would require two steps up to equal one step down. Furthermore, the steps up and down need not be the same for each step. The size of the steps up and the steps down may vary for any or all the steps.

The various embodiments which demonstrate a method for controlling a fan in an air conditioning system have been discussed in detail above. It should be further noted that the above-described processes can be stored as instructions in computer-readable storage medium. When the instructions are executed by a computer (e.g., processor 163), for example after being loaded from a computer-readable storage medium (e.g., a memory 166 in the controller 160), the process(es) are performed. In one or more embodiments, a non-transitory computer readable medium may be provided which comprises instructions for execution by a computer, the instructions including a computer-implemented method for controlling an air-conditioning system to defrost a condenser coil, as described above. The non-transitory computer readable medium may comprise, for example, a read-only memory (ROM), a random-access memory (RAM), a programmable ROM (PROM), and/or an electrically erasable read-only memory (EEPROM).

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

The invention claimed is:

1. A computer-implemented method of controlling operation of an indoor fan configured to blow air through the indoor heat exchanger in an air conditioning system, the air conditioning system including the indoor heat exchanger, the indoor fan, and a compressor configured to pump refrigerant through the indoor heat exchanger, the method comprising:

setting a fan speed of the indoor fan to a maximum value;

storing a first low temperature as a first low temperature threshold;

measuring an indoor temperature in an indoor space serviced by the air conditioning system as a current indoor temperature;

subtracting a set point temperature that represents a desired temperature for the indoor space from the current indoor temperature to determine a current temperature difference between the current indoor temperature and the set point temperature;

determining that the current temperature difference is less than the first low temperature threshold;

reducing the fan speed by a first adjustment interval in response to the determining that the current temperature difference is less than the first low temperature threshold;

storing a second low temperature as a second low temperature threshold in response to the determining that the current temperature difference is less than the first low temperature threshold;

storing a second high temperature as a second high temperature threshold in response to the determining that the current temperature difference is less than the first low temperature threshold;

at a delay time after the reducing of the fan speed of the indoor fan by the first adjustment interval, measuring the indoor temperature as the current indoor temperature;

subtracting the set point temperature from the current indoor temperature to determine the current temperature difference between the current indoor temperature and the set point temperature;

determining that the current temperature difference is less than the second low temperature threshold;

reducing the fan speed of the indoor fan by a second adjustment interval in response to the determining that the current temperature difference is less than the second low temperature threshold;

storing a third low temperature as a third low temperature threshold in response to the determining that the current temperature difference is less than the second low temperature threshold; and storing a third high temperature as a third high temperature threshold in response to the determining that the current temperature difference is less than the second low temperature threshold, wherein the first low temperature is lower than a compressor reduction temperature threshold that represents a temperature at which the air conditioning system begins lowering an operation frequency of the compressor, the second high temperature is greater than the first low temperature, the second low temperature is smaller than the first low temperature, the third high temperature is between the second low temperature and the first low temperature, and the third low temperature is smaller than the second low temperature.

2. The method of controlling the controlling operation of the fan, as recited in claim 1, wherein the first adjustment interval is between 10% of a maximum fan speed and 20% of the maximum fan speed, and the second adjustment interval is between 10% of a maximum fan speed and 20% of the maximum fan speed.

3. The method of controlling the controlling operation of the fan, as recited in claim 1, wherein the first adjustment interval is the same as the second adjustment interval.

4. The method of controlling the controlling operation of the indoor fan, as recited in claim 1, further comprising:

setting the fan speed to a minimum value after the reducing of the fan speed of the indoor fan by the second adjustment interval;

storing a fifth high temperature as a fifth high temperature threshold after the reducing of the fan speed of the indoor fan by the second adjustment interval;

after the setting of the fan speed to the minimum value, measuring the indoor temperature as the current indoor temperature;

subtracting the set point temperature from the current indoor temperature to determine the current temperature difference between the current indoor temperature and the set point temperature;

determining that the current temperature difference is greater than the fifth high temperature threshold;

increasing the fan speed of the indoor fan by a third adjustment interval in response to the determining that the current temperature difference is greater than the fifth high temperature threshold;

storing a fourth low temperature as a fourth low temperature threshold in response to the determining that the current temperature difference is greater than the fifth high temperature threshold; and storing a fourth high temperature as a fourth high temperature threshold in response to the determining that the current temperature difference is greater than the fifth high temperature threshold, wherein the fourth high temperature is between the third low temperature and the second low temperature, the fourth low temperature is smaller than the fifth high temperature, and the fifth high temperature is between the fourth low temperature and the third low temperature.

5. The method of controlling the controlling operation of the indoor fan, as recited in claim 4, wherein the first adjustment interval is between 10% of a maximum fan speed and 20% of the maximum fan speed, the second adjustment interval is between 10% of a maximum fan speed and 20% of the maximum fan speed, and the fourth adjustment interval is between 10% of a maximum fan speed and 20% of the maximum fan speed.

6. The method of controlling the controlling operation of the indoor fan, as recited in claim 4, wherein at least two of the first adjustment interval, the second adjustment interval, and the fourth adjustment interval have different values.

7. The method of controlling the controlling operation of the indoor fan, as recited in claim 1, further comprising:

at the delay time after the reducing of the fan speed of the indoor fan by the second adjustment interval, measuring the indoor temperature as the current indoor temperature;

subtracting the set point temperature from the current indoor temperature to determine the current temperature difference between the current indoor temperature and the set point temperature;

determining that the current temperature difference is greater than the third high temperature threshold;

increasing the fan speed of the indoor fan by the first second adjustment interval in response to the determining that the current temperature difference is greater than the third high temperature threshold; and storing the second low temperature as the second low temperature threshold and storing the second high temperature as the second high temperature threshold in response to the determining that the current temperature difference is greater than the third high temperature threshold.

8. The method of controlling the controlling operation of the indoor fan, as recited in claim 1, wherein the controller is further configured to reduce an operation frequency of the compressor at each of a set compressor adjustment temperature thresholds starting at the compressor reduction temperature threshold, and between two and five compressor adjustment temperature thresholds are located between the compressor reduction temperature threshold and the first low temperature.

9. The method of controlling the controlling operation of the indoor fan, as recited in claim 8, wherein the controller is further configured to reduce the operation frequency of the compressor by between 5% and 10% of a maximum compressor frequency at each of the compressor adjustment temperature thresholds.

10. The method of controlling the controlling operation of the indoor fan, as recited in claim 1, wherein there are between three and five adjustment intervals between the maximum fan speed and a minimum fan speed.

11. A non-transitory computer-readable medium comprising instructions for execution by a computer, the instructions including a computer-implemented method for controlling operation of an indoor fan configured to blow air through the indoor heat exchanger in an air conditioning system, the air conditioning system including the indoor heat exchanger, the indoor fan, a compressor configured to pump refrigerant through the indoor heat exchanger, the instructions for implementing:
  setting a fan speed of the indoor fan to a maximum value;
  storing a first low temperature as a first low temperature threshold;
  measuring an indoor temperature in an indoor space serviced by the air conditioning system as a current indoor temperature;
  subtracting a set point temperature that represents a desired temperature for the indoor space from the current indoor temperature to determine a current temperature difference between the current indoor temperature and the set point temperature;
  determining that the current temperature difference is less than the first low temperature threshold;
  reducing the fan speed by a first adjustment interval in response to the determining that the current temperature difference is less than the first low temperature threshold;
  storing a second low temperature as a second low temperature threshold in response to the determining that the current temperature difference is less than the first low temperature threshold; and
  storing a second high temperature as a second high temperature threshold in response to the determining that the current temperature difference is less than the first low temperature threshold;
  at a delay time after the reducing of the fan speed of the indoor fan by the first adjustment interval, measuring the indoor temperature as the current indoor temperature;
  subtracting the set point temperature from the current indoor temperature to determine the current temperature difference between the current indoor temperature and the set point temperature;
  determining that the current temperature difference is less than the second low temperature threshold;
  reducing the fan speed of the indoor fan by a second adjustment interval in response to the determining that the current temperature difference is less than the second low temperature threshold;
  storing a third low temperature as a third low temperature threshold in response to the determining that the current temperature difference is less than the second low temperature threshold; and
  storing a third high temperature as a third high temperature threshold in response to the determining that the current temperature difference is less than the second low temperature threshold,
  wherein
  the first low temperature is lower than a compressor reduction temperature threshold that represents a temperature at which the air conditioning system begins lowering an operation frequency of the compressor,
  the second high temperature is greater than the first low temperature,
  the second low temperature is smaller than the first low temperature,
  the third high temperature is between the second low temperature and the first low temperature, and
  the third low temperature is smaller than the second low temperature.

12. The non-transitory computer-readable medium, as recited in claim 11, wherein
  the instructions further implement:
    setting the fan speed to a minimum value after the reducing of the fan speed of the indoor fan by the second adjustment interval;
    storing a fifth high temperature as a fifth high temperature threshold after the reducing of the fan speed of the indoor fan by the second adjustment interval;
    after the setting of the fan speed to the minimum value, measuring the indoor temperature as the current indoor temperature;
    subtracting the set point temperature from the current indoor temperature to determine the current temperature difference between the current indoor temperature and the set point temperature;
    determining that the current temperature difference is greater than the fifth high temperature threshold;
    increasing the fan speed of the indoor fan by a third adjustment interval in response to the determining that the current temperature difference is greater than the fifth high temperature threshold;
    storing a fourth low temperature as a fourth low temperature threshold in response to the determining that the current temperature difference is greater than the fifth high temperature threshold; and
    storing a fourth high temperature as a fourth high temperature threshold in response to the determining that the current temperature difference is greater than the fifth high temperature threshold,
  the fourth high temperature is between the third low temperature and the second low temperature,
  the fourth low temperature is smaller than the fifth high temperature, and
  the fifth high temperature is between the fourth low temperature and the third low temperature.

13. The non-transitory computer-readable medium, as recited in claim 11, wherein
  the instructions further implement:
    at the delay time after the reducing of the fan speed of the indoor fan by the second adjustment interval, measuring the indoor temperature as the current indoor temperature;
    subtracting the set point temperature from the current indoor temperature to determine the current temperature difference between the current indoor temperature and the set point temperature;
    determining that the current temperature difference is greater than the third high temperature threshold;
    increasing the fan speed of the indoor fan by the second adjustment interval in response to the determining that the current temperature difference is greater than the third high temperature threshold; and
    storing the second low temperature as the second low temperature threshold and storing the second high temperature as the second high temperature threshold in response to the determining that the current temperature difference is greater than the third high temperature threshold.

14. The non-transitory computer-readable medium, as recited in claim 11, wherein
  the controller is further configured to reduce an operation frequency of the compressor at each of a set compressor adjustment temperature thresholds starting at the compressor reduction temperature threshold, and between two and five compressor adjustment temperature thresholds are located between the compressor reduction temperature threshold and the first low temperature.

15. A computer system configured for controlling operation of an indoor fan configured to blow air through the indoor heat exchanger in an air conditioning system, the air conditioning system including the indoor heat exchanger, the indoor fan, and a compressor configured to pump refrigerant through the indoor heat exchanger, the system comprising:
a communications interface operable to transmit and receive communications over at least a portion of the air conditioning system;
a memory configured to store data and instructions; and
a processor cooperatively operable with the communications interface and the memory, and configured to facilitate:
setting a fan speed of the indoor fan to a maximum value;
storing a first low temperature as a first low temperature threshold;
measuring an indoor temperature in an indoor space serviced by the air conditioning system as a current indoor temperature;
subtracting a set point temperature that represents a desired temperature for the indoor space from the current indoor temperature to determine a current temperature difference between the current indoor temperature and the set point temperature;
determining that the current temperature difference is less than the first low temperature threshold;
reducing the fan speed by a first adjustment interval in response to the determining that the current temperature difference is less than the first low temperature threshold;
storing a second low temperature as a second low temperature threshold in response to the determining that the current temperature difference is less than the first low temperature threshold;
storing a second high temperature as a second high temperature threshold in response to the determining that the current temperature difference is less than the first low temperature threshold;
at a delay time after the reducing of the fan speed of the indoor fan by the first adjustment interval, measuring the indoor temperature as the current indoor temperature;
subtracting the set point temperature from the current indoor temperature to determine the current temperature difference between the current indoor temperature and the set point temperature;
determining that the current temperature difference is less than the second low temperature threshold;
reducing the fan speed of the indoor fan by a second adjustment interval in response to the determining that the current temperature difference is less than the second low temperature threshold;
storing a third low temperature as a third low temperature threshold in response to the determining that the current temperature difference is less than the second low temperature threshold; and
storing a third high temperature as a third high temperature threshold in response to the determining that the current temperature difference is less than the second low temperature threshold,
wherein
the first low temperature is lower than a compressor reduction temperature threshold that represents a temperature at which the air conditioning system begins lowering an operation frequency of the compressor,
the second high temperature is greater than the first low temperature,
the second low temperature is smaller than the first low temperature,
the third high temperature is between the second low temperature and the first low temperature, and
the third low temperature is smaller than the second low temperature.

16. The computer system, as recited in claim 15, the processor being further configured to facilitate;
setting the fan speed to a minimum value after the reducing of the fan speed of the indoor fan by the second adjustment interval;
storing a fifth high temperature as a fifth high temperature threshold after the reducing of the fan speed of the indoor fan by the second adjustment interval;
after the setting of the fan speed to the minimum value, measuring the indoor temperature as the current indoor temperature;
subtracting the set point temperature from the current indoor temperature to determine the current temperature difference between the current indoor temperature and the set point temperature;
determining that the current temperature difference is greater than the fifth high temperature threshold;
increasing the fan speed of the indoor fan by a third adjustment interval in response to the determining that the current temperature difference is greater than the fifth high temperature threshold;
storing a fourth low temperature as a fourth low temperature threshold in response to the determining that the current temperature difference is greater than the fifth high temperature threshold; and
storing a fourth high temperature as a fourth high temperature threshold in response to the determining that the current temperature difference is greater than the fifth high temperature threshold,
wherein
the fourth high temperature is between the third low temperature and the second low temperature,
the fourth low temperature is smaller than the fifth high temperature, and
the fifth high temperature is between the fourth low temperature and the third low temperature.

17. The computer system, as recited in claim 15, the processor being further configured to facilitate:
at the delay time after the reducing of the fan speed of the indoor fan by the second adjustment interval, measuring the indoor temperature as the current indoor temperature;
subtracting the set point temperature from the current indoor temperature to determine the current temperature difference between the current indoor temperature and the set point temperature;
determining that the current temperature difference is greater than the third high temperature threshold;
increasing the fan speed of the indoor fan by the second adjustment interval in response to the determining that the current temperature difference is greater than the third high temperature threshold; and
storing the second low temperature as the second low temperature threshold and storing the second high temperature as the second high temperature threshold in response to the determining that the current temperature difference is greater than the third high temperature threshold.

\* \* \* \* \*